US012553270B2

(12) United States Patent
Bacchetti

(10) Patent No.: US 12,553,270 B2
(45) Date of Patent: Feb. 17, 2026

(54) HINGE FOR DOORS OR SWING SHUTTER, IN PARTICULAR FOR REFRIGERATED CABINETS, AS WELL AS A SYSTEM THAT INCLUDES THIS HINGE

(71) Applicant: IN & TEC S.r.l., Brescia (IT)

(72) Inventor: Luciano Bacchetti, Nave (IT)

( * ) Notice: Subject to any disclaimer, the term of this patent is extended or adjusted under 35 U.S.C. 154(b) by 9 days.

(21) Appl. No.: 18/837,592

(22) PCT Filed: Feb. 13, 2023

(86) PCT No.: PCT/IB2023/051283
§ 371 (c)(1),
(2) Date: Aug. 10, 2024

(87) PCT Pub. No.: WO2023/156893
PCT Pub. Date: Aug. 24, 2023

(65) Prior Publication Data

US 2025/0188783 A1 Jun. 12, 2025

(30) Foreign Application Priority Data

Feb. 18, 2022 (IT) ........................ 102022000003044
Feb. 18, 2022 (IT) ........................ 102022000003062

(51) Int. Cl.
*E05F 3/20* (2006.01)
*E05F 1/12* (2006.01)

(52) U.S. Cl.
CPC .............. *E05F 1/1246* (2013.01); *E05F 3/20* (2013.01); *E05Y 2201/684* (2013.01); *E05Y 2600/622* (2013.01); *E05Y 2900/31* (2013.01)

(58) Field of Classification Search
CPC ..... E05F 3/104; E05F 3/10; E05F 3/20; E05F 3/225; E05F 3/227; E05F 1/1246; E05F 1/1253; E05F 3/04; E05Y 2201/638; E05Y 2201/684; E05Y 2800/268; E05Y 2800/676; E05Y 2900/31; E05Y 2900/132;
(Continued)

(56) References Cited

U.S. PATENT DOCUMENTS 3,496,595 A * 2/1970 Larson .................... F16C 11/04 16/289
3,683,454 A * 8/1972 Gronbach ............. E05F 1/1261 16/290
(Continued)

FOREIGN PATENT DOCUMENTS

CN 104358483 A * 2/2015
CN 106917553 7/2017
(Continued)

*Primary Examiner* — Chuck Y Mah
(74) *Attorney, Agent, or Firm* — Themis Law

(57) ABSTRACT

A hinge for a swing closing element includes a hinge body and a third male or female connection element defining an axis that are coupled to each other to rotate with respect to each other between an open and a closed position. The hinge body includes a curvilinear guide slot defining an angular trajectory that lays on a plane substantially perpendicular to the defined axis. The third male or female connection element is engaged in the curvilinear guide slot so that upon the mutual rotation of the third male or female connection element and of the hinge body, the defined axis translates along the angular trajectory.

13 Claims, 17 Drawing Sheets

(58) Field of Classification Search
CPC ......... E05Y 2900/146; E05Y 2900/148; E05Y 2600/452; E05Y 2600/41; E05Y 2600/622; E05D 7/086; E05D 7/10; E05D 3/02; E05D 5/10; E05D 5/14; E05D 9/005; E05D 11/0054; E05D 11/02
See application file for complete search history.

(56) References Cited

U.S. PATENT DOCUMENTS

| | | | | |
|---|---|---|---|---|
| 4,091,502 | A * | 5/1978 | Little | E05D 11/1064 16/85 |
| 6,438,799 | B1 | 8/2002 | Gronbach | |
| 10,378,259 | B2 | 8/2019 | Miglioranzo | |
| 2015/0354261 | A1* | 12/2015 | Dora | E05F 15/70 49/31 |
| 2017/0045287 | A1 | 2/2017 | Liu | |
| 2022/0252329 | A1* | 8/2022 | Xia | E05D 3/18 |

FOREIGN PATENT DOCUMENTS

| | | | | |
|---|---|---|---|---|
| CN | 212898047 | U * | 4/2021 | |
| CN | 213980378 | U * | 8/2021 | |
| EP | 3095940 | | 11/2016 | |
| KR | 100461641 | B1 * | 12/2004 | F25D 23/028 |
| WO | 9516845 | | 6/1995 | |
| WO | WO-2018109130 | A1 * | 6/2018 | E05F 1/1261 |

* cited by examiner

HINGE FOR DOORS OR SWING SHUTTER, IN PARTICULAR FOR REFRIGERATED CABINETS, AS WELL AS A SYSTEM THAT INCLUDES THIS HINGE

TECHNICAL FIELD

The present invention generally relates to the technical field of hinges, and it particularly relates to a hinge for doors or swing shutters, in particular but not exclusively for refrigerated cabinet, as well as a system which includes such hinge.

STATE OF THE ART

Closing hinges for doors or swing shutters, in particular for refrigerators, which allow the latter to "detach" from the basic door frame when opening, that is to rotate around an axis external thereto so as not to impact against it, are known. To this end, the rotation axis of such hinges is arranged flushed with the basic door frame against which the door or shutter closes.

Such closing hinges are generally concealably inserted into the frame or shutter and include a generally cylindrical hinge body with a torsion spring suitable to interact with the basic door frame to ensure the closing of the door or shutter once opened.

Such known hinges have various disadvantages.

First and foremost, the assembly of the door or shutter provided with such hinges on the structure which supports it is extremely complicated, even due to the fact that the weight of such doors or shutters is often considerable and they are therefore difficult to handle.

Furthermore, such hinges do not have any control and therefore the doors or shutters close often violently banging against the basic door frame, with ensuing potential damage to the structure or to the users or operators who act on the door or shutter.

Still, such known hinges do not allow to block the door or shutter in the open position, for example to load or pick up products from a refrigerator.

SUMMARY OF THE INVENTION

An object of the present invention is to at least partly overcome the drawbacks illustrated above by providing a hinge for doors or swing shutters that is highly efficient and cost-effective.

Another object of the present invention is to provide a hinge for a swing door or door leaf that allows a simple assembly of the latter onto the structure which supports it.

Another object of the present invention is to provide a hinge for a swing door or shutter which minimises or eliminates the hazard of injury or damage to people or property due to the impact of the swing door or shutter against the basic door frame of the structure which supports it.

Another object of the present invention is to provide a hinge for a swing door or shutter which allows to keep the latter in the open position.

These and other objects which will be more apparent hereinafter, are attained by a hinge for a swing closing element and/or by a system which includes it as described, illustrated and/or claimed hereinafter.

In a further aspect, irrespective of the above, there may be provided for a hinge that is highly safe as described, illustrated and/or claimed hereinafter.

The dependent claims define advantageous embodiments of the invention.

BRIEF DESCRIPTION OF THE DRAWINGS

Further characteristics and advantages of the invention will be more apparent in light of the detailed description of some preferred but non-exclusive embodiments of the invention, illustrated by way of non-limiting example with reference to the attached drawings, wherein.

DETAILED DESCRIPTION OF SOME PREFERRED EMBODIMENTS

Figure 1A:
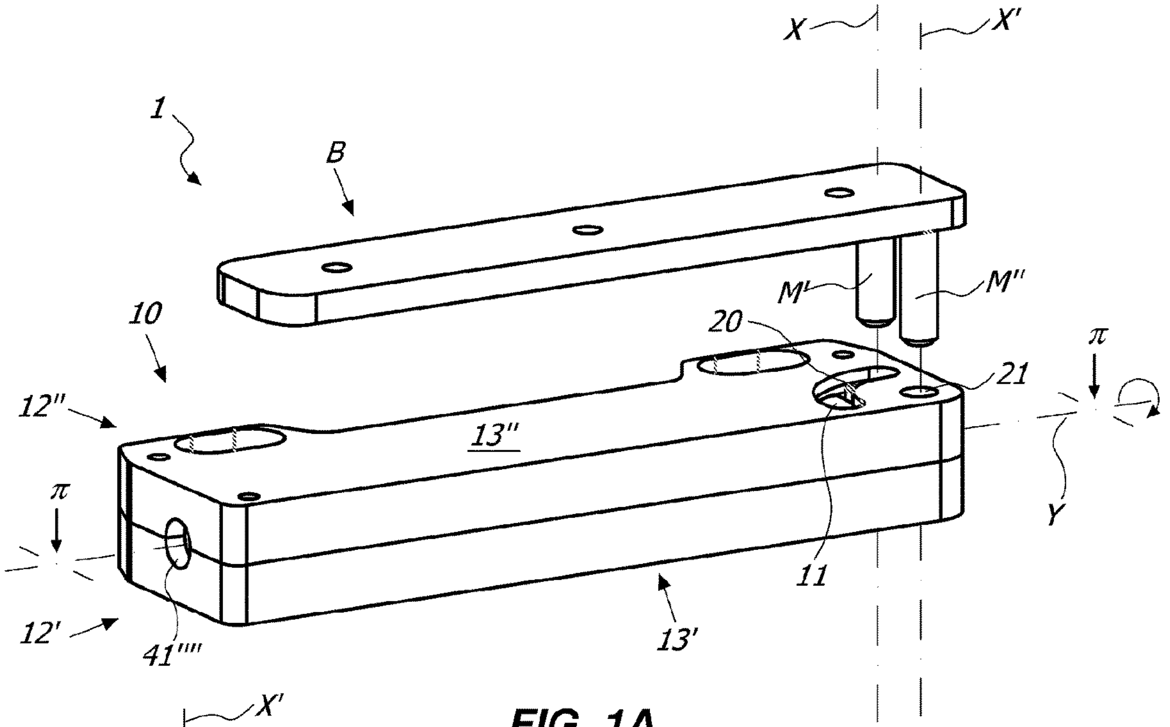
FIGS. 1A and 1B are axonometric figures of a first preferred but not exclusive embodiment of the hinge 1 provided with a fastening bracket B between them rotated to define a right hinge (FIG. 1A) and a left hinge (FIG. 1B)

With reference to the attached figures, herein described is a hinge 1 particularly suitable for the rotatable mutual connection of a swing closing element D and a stationary support structure F around a rotation axis X'.

Both the swing closing element D and the stationary support structure F may be of any type.

For example, the swing closing element D may be a swing door or shutter provided or not provided with a cover strip C, while the stationary support structure F may be a frame or basic door frame.

In a preferred use but not exclusive intended use, the hinge 1 may be suitable to mutually connect a shutter D and the frame F of a refrigerator. Although such intended use will be described below, it should be understood that the hinge 1 may be used with any closing element and any stationary support structure without departing from the scope of protection of the attached claims.

Various embodiments of the hinge 1, both mechanical and hydraulic, are described in the attached drawings by way of non-limiting example.

Essentially, in all embodiments illustrated herein, the hinge 1 may comprise a hinge body 10 which can be mutually connected with the frame F, for example using fastening elements such as screws or rivets and two female connection elements 20, 21 which can be mutually connected with the shutter D using the fastening bracket B.

However, it is clear that the hinge body 10 may be connected to the shutter D and the fastening elements 20, 21 may be connected to the frame F without departing from the scope of protection of the attached claims.

Furthermore, it is clear that the connection elements 20, 21 may also both be of the male type or one of the male type and the other of the female type, without departing from the scope of protection of the attached claims.

The hinge body 10 may be substantially prismatic-shaped with substantially quadrangular base, and possibly it may be substantially plate-like.

Furthermore, suitably, the hinge body 10 may be formed by two half-shells 12, 12', which can be coupled to each other. The half-shells 12, 12' may be made of metallic or polymeric material, for example technopolymer.

The female connection elements 20, 21 may define respective axes X, X', which are substantially parallel to each other.

The hinge body 10 and the female connection elements 20, 21 may be mutually rotatably connected, so as to rotate one with respect to the other around the axis X' between an open and a closed position.

To this end, the hinge body 10 may comprise a curvilinear guide slot 11 in which there is engaged the female connection element 20, which may for example be defined by a roller. The curvilinear guide slot 11 may define an angular trajectory T lying on a plane $\pi$ substantially perpendicular to the axes X and X'.

The connection between the hinge body 10 and the shutter D is provided by the male elements M', M" of the fastening bracket B, which are engaged, preferably removably, in the female connection elements 20, 21 so as to lie respectively along the axes X, X'. In other words, once mutually engaged, the axes defined by the female connection elements 20, 21 and those defined by the male elements M', M" may substantially coincide.

Advantageously, between the fastening bracket B and the hinge body 10 there may be arranged an anti-friction element W, for example an annular bushing, preferably fitted onto the male connection element M".

In a further embodiment, the male elements M', M" may be made monolithically with the shutter D, without departing from the scope of protection of the attached claims.

Similarly to the connection elements 20, 21, also the connection elements M', M" may also be both of the female type or one male and the other female without departing from the scope of protection of the attached claims.

In this manner, the rotation around the axis X' of the shutter D, pivoted by means of the male element M" and the female connection element 21 on the hinge body 10 in turn fixed to the frame F, will cause the translation of the female connection element 20 in the curvilinear slot 11, and therefore of the axis X along the angular trajectory T. Therefore, the axis X may rotate around the axis X', that is the rotation axis of the door.

The curvilinear slot 11 may have two opposite abutment points for the female connection element 20, which define the closing and maximum opening positions of the shutter D.

In the light of the above, the swing shutter D may detach from the frame F for the entire rotation thereof.

The present invention has various advantages with respect to the prior art.

Figure 2B:
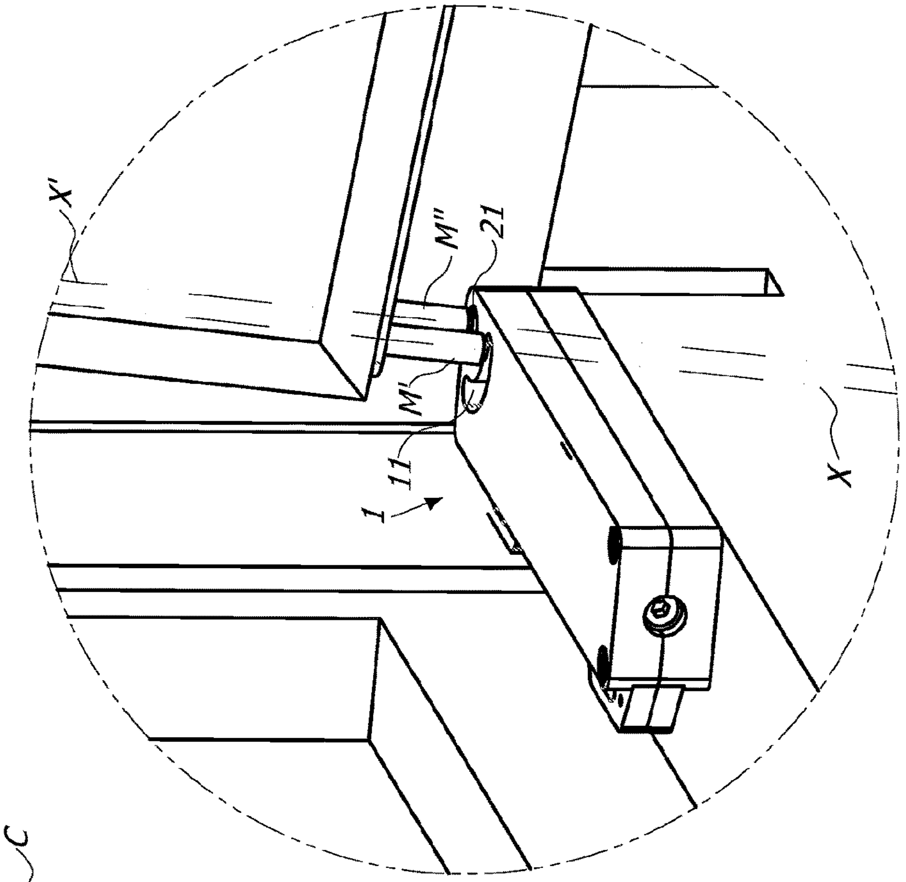
FIG. 2 is a schematic figure for assembling a shutter D on a frame F through the embodiment of the hinge 1 of FIG. 1.
Figure 2A:
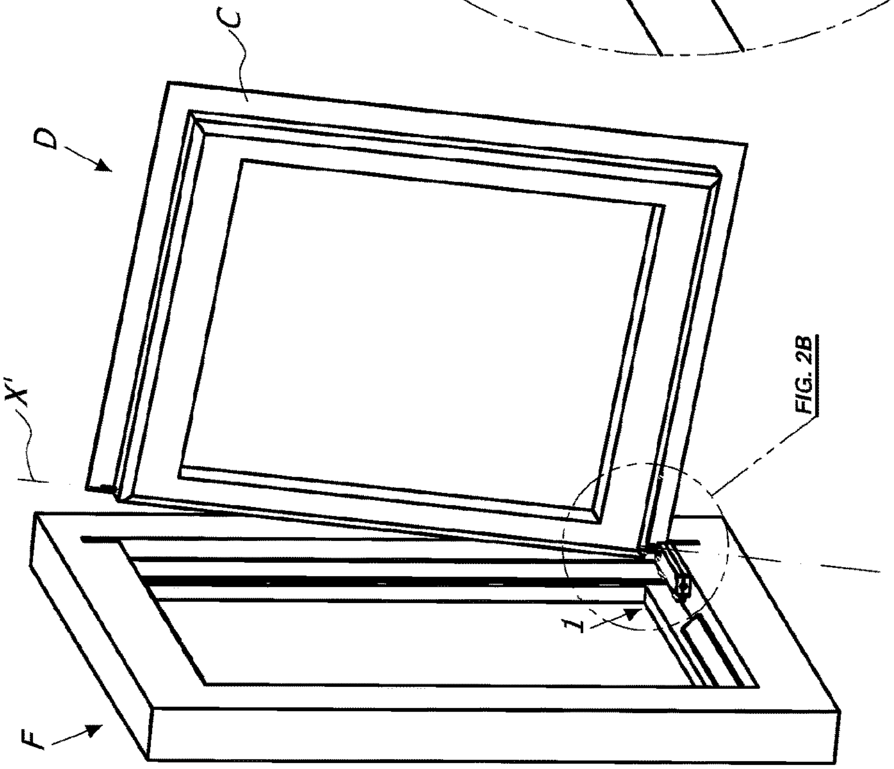
Figure 3:
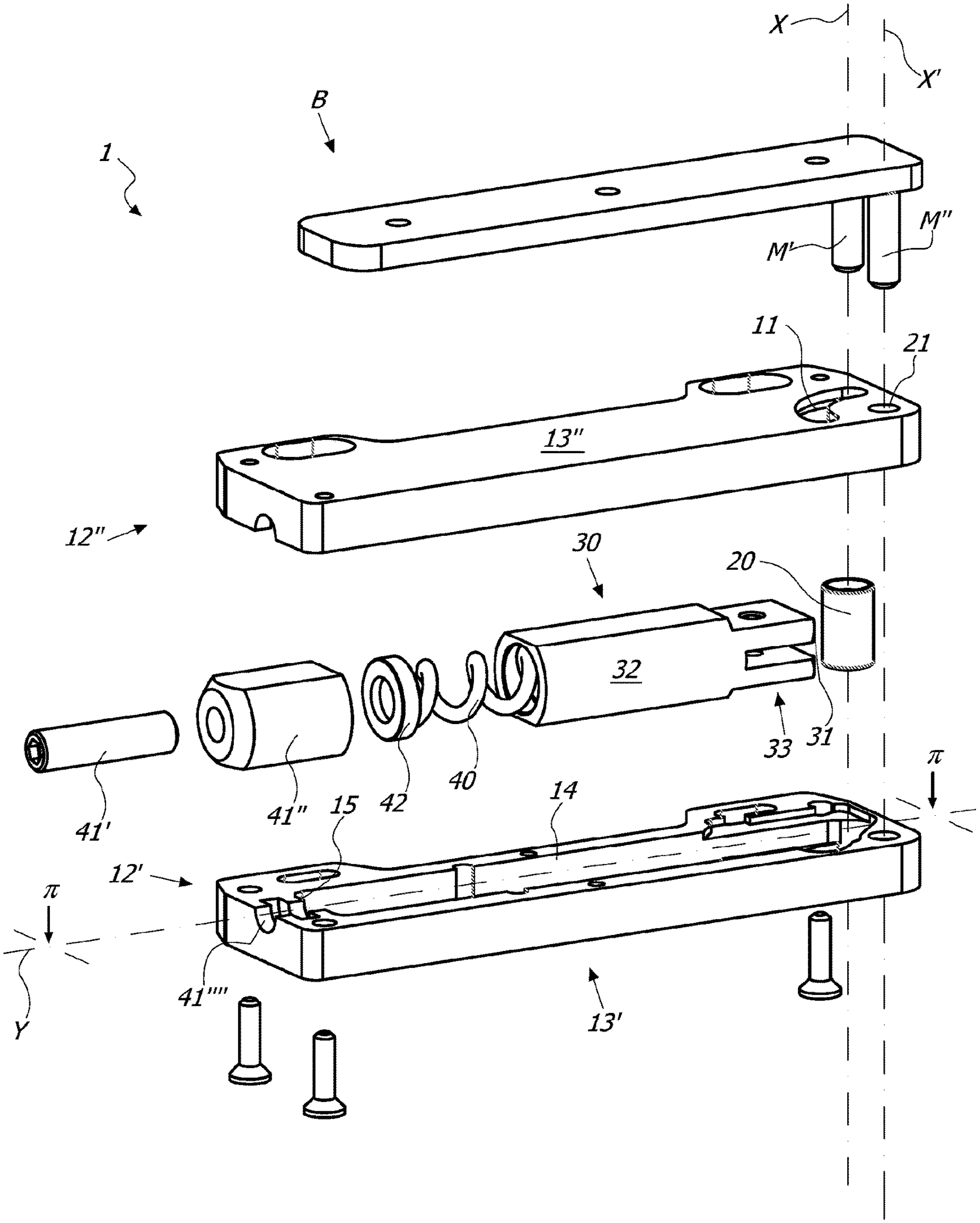
FIG. 3 is an axonometric exploded figure of the embodiment of the hinge 1 of FIGS. 1A and 1B.

First and foremost, the hinge 1 allows an easy assembly of the shutter D on the frame F. As a matter of fact, for example as shown in FIG. 2, upon fastening the hinge 1 on the frame F and the bracket B on the shutter D it is sufficient to simply insert the two male elements M', M" into the female elements 20, 21.

Such high versatility makes the hinge 1 ideal even for retrofitting, for example of existing refrigerated cabinet.

Furthermore 1, the hinge has minimal overall dimensions and a high aesthetic appeal.

Furthermore 1, the hinge allows a wide freedom of design for the designer, given that the rotation axis of the shutter can be moved by acting on the distance between the female connection elements 20, 21 or even on the relative position between the latter and the curvilinear slot, like in the embodiment shown in FIGS. 12 to 14C.

Preferably, in order to minimise the overall dimensions of the hinge, the second female connection element 21 may be arranged in an angular position on the hinge body 10, as shown in the attached drawings.

Figure 15:
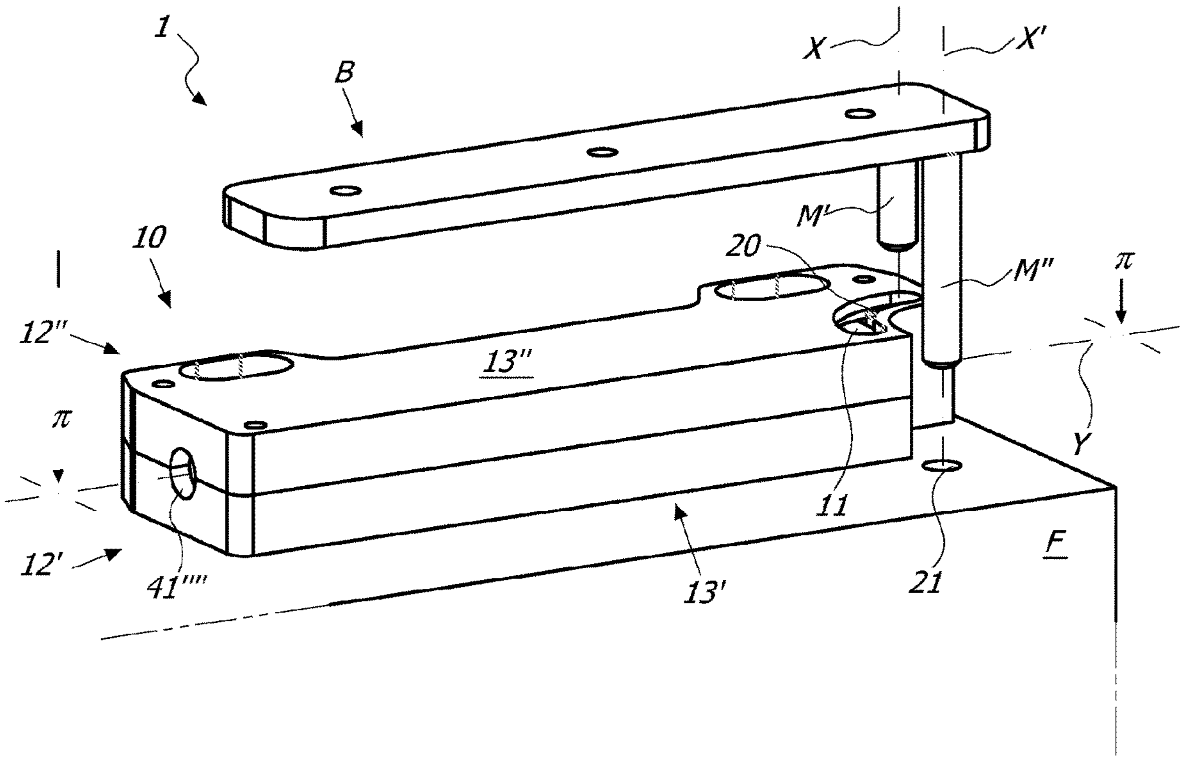
FIG. 15 is an axonometric figure of a further preferred but not exclusive embodiment of the hinge 1, wherein the female connection element 21 is obtained on the frame F.

It is clear that the hinge 1 may also comprise only the male or female connection element 20 without departing from the scope of protection of the attached claims. In this case, the closing element D may be directly pivoted on the stationary support structure F to rotate around the rotation axis X', for example as shown in FIG. 15.

Advantageously, the curvilinear guide slot 11 and the female connection elements 20, 21 may pass through the hinge body 10 to extend between a first and a second outer surface 13', 13" opposite with respect to each other with respect to the plane $\pi$.

In this manner, the male connection elements M', M" of the fastening bracket B may be inserted into the female connection elements 20, 21 at both surfaces 13', 13".

Figure 1B:
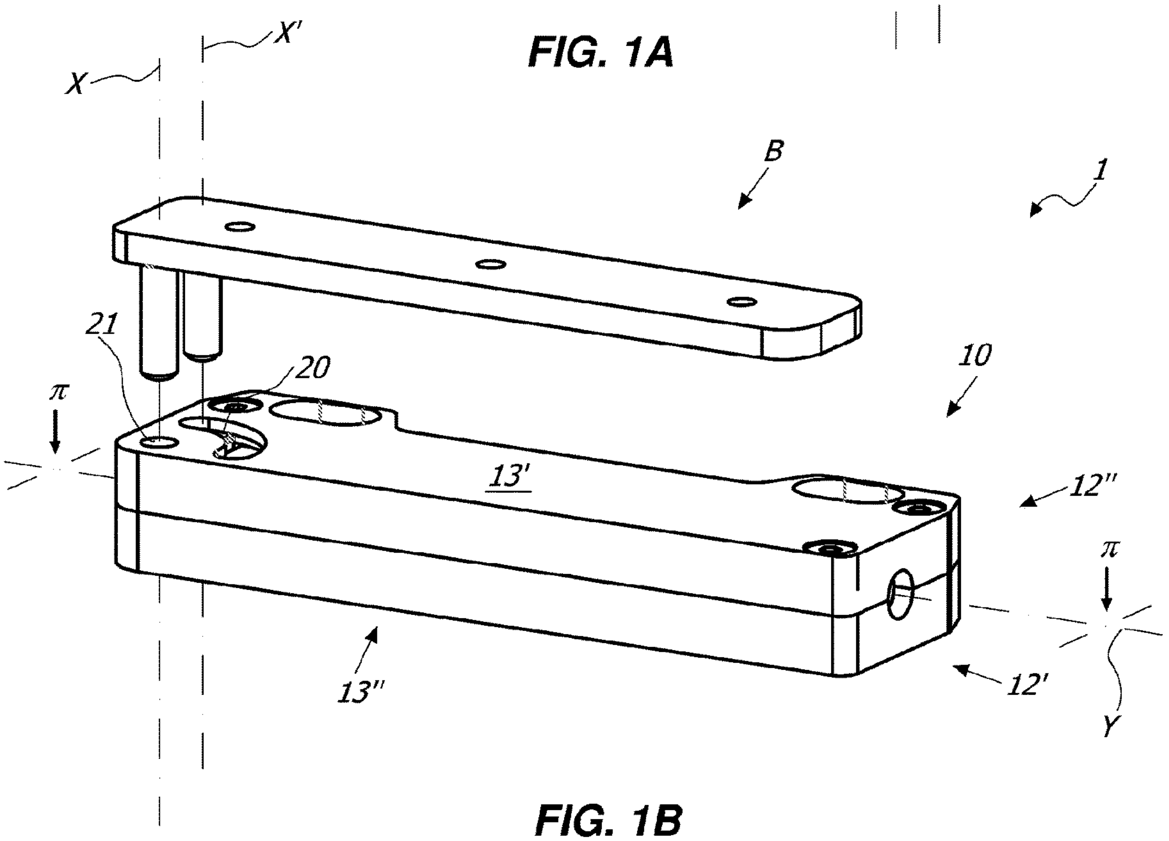

In this manner, the hinge 1 will be ambidextrous by rotating around the axis Y for example as shown in FIGS. 1A and 1B.

As shown in the attached drawings, the hinge 1 may be a mechanical or hydraulic closing and/or damping hinge.

As a matter of fact, in FIGS. 1 to 7, there is shown a mechanical closing hinge, as better specified below.

Figure 8:
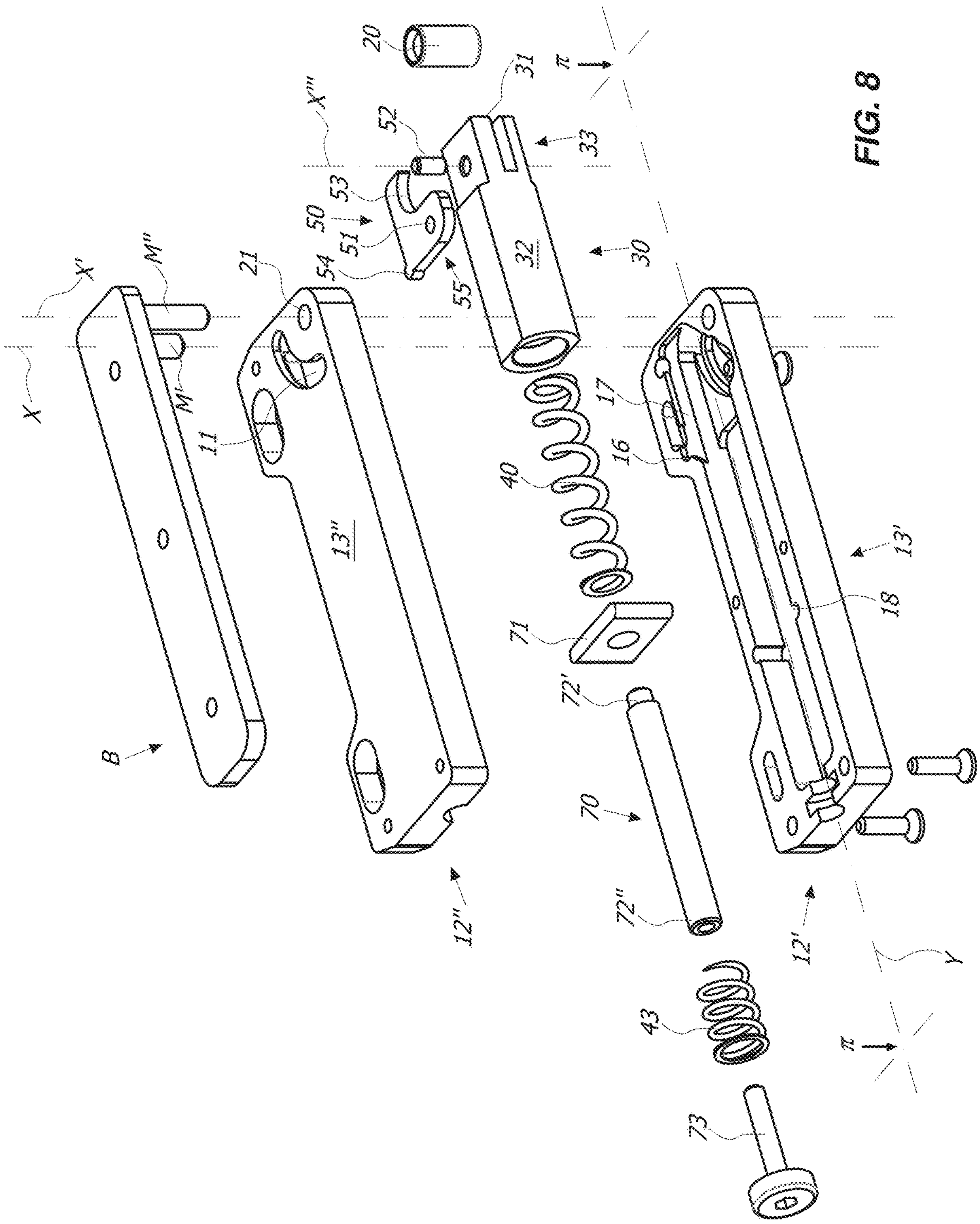
FIG. 8 is an axonometric exploded figure of a second preferred but not exclusive embodiment of the hinge 1.
Figure 9A:
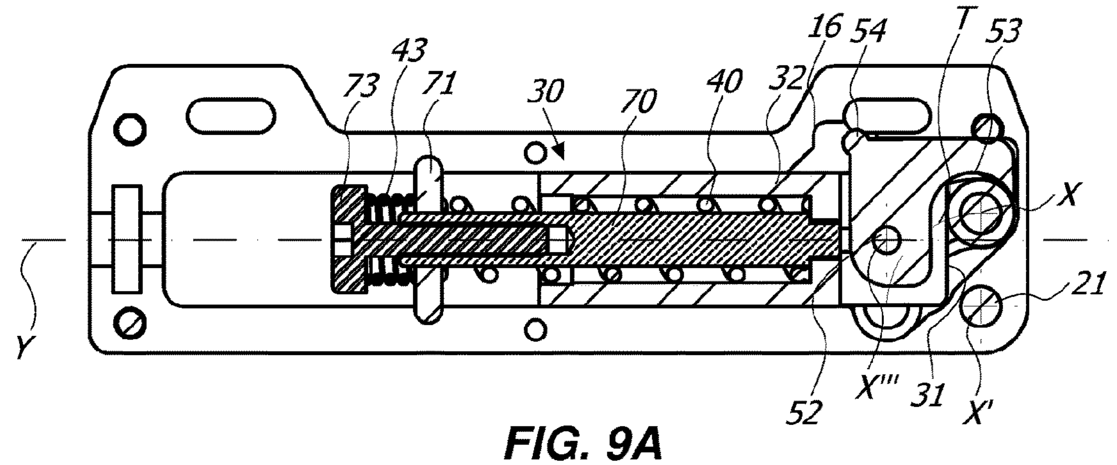
FIGS. 9A, 9B and 9C are cross-sectional figures of the second embodiment of the hinge 1 of FIG. 8 in closed, open at 45° and open at 90° position, with FIG. 9D showing some enlarged details of FIG. 9B.
Figure 9B:
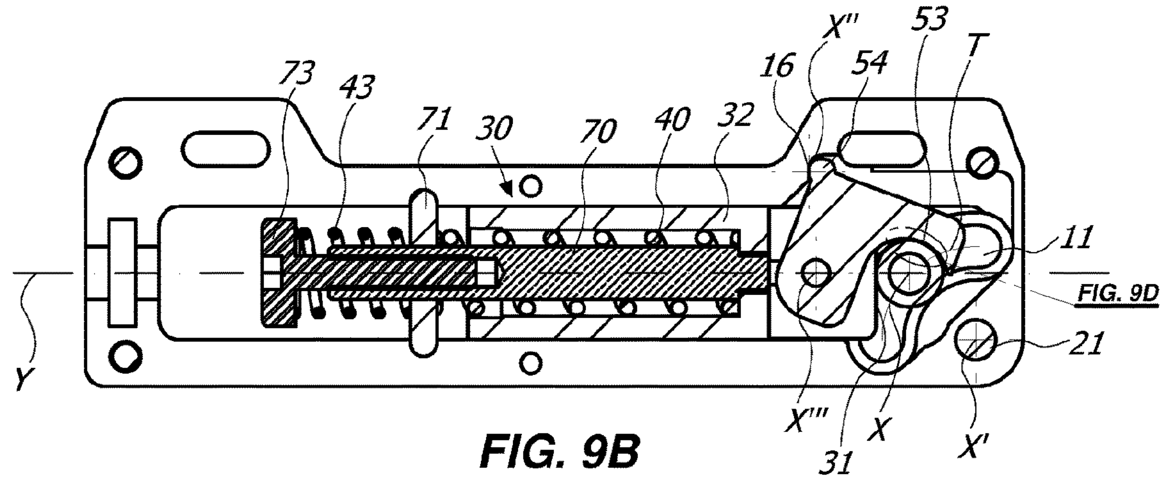
Figure 9C:
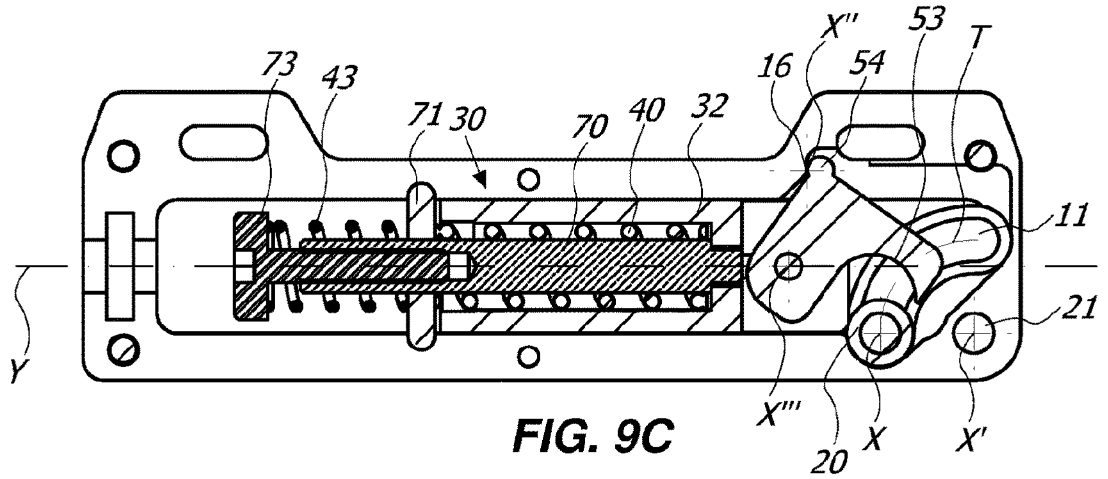
Figure 9D:
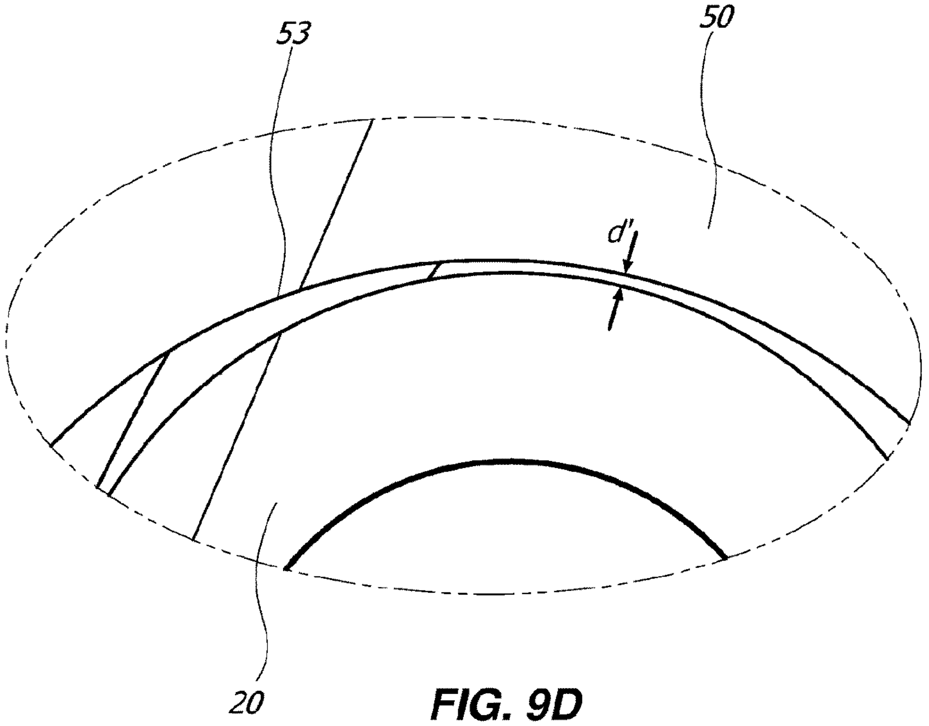

Furthermore, FIGS. 8 to 9D show a mechanically damped closing hinge, as better specified below.

Figure 10:
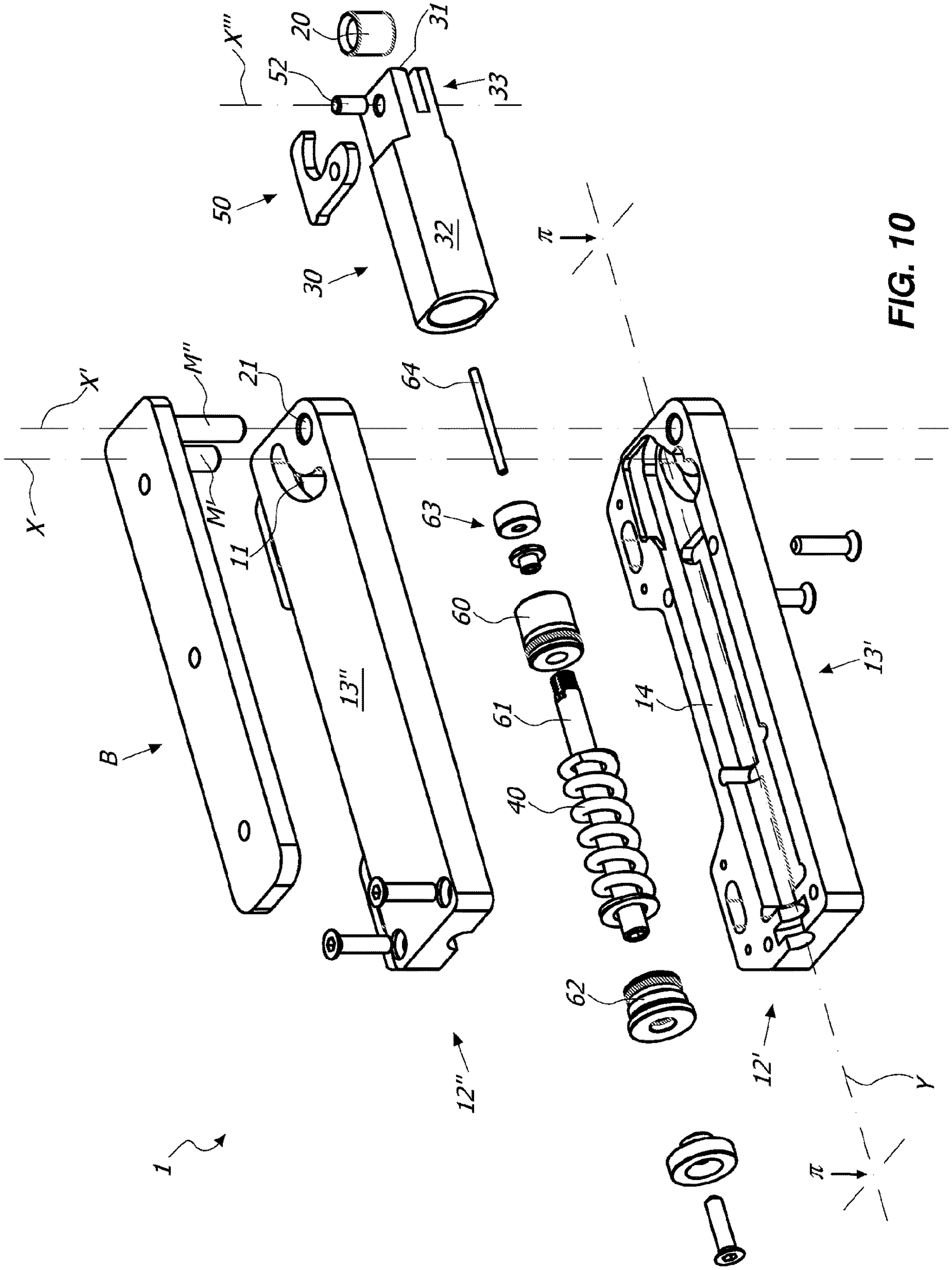
FIG. 10 is an axonometric exploded figure of a third preferred but not exclusive embodiment of the hinge 1.
Figure 11A:
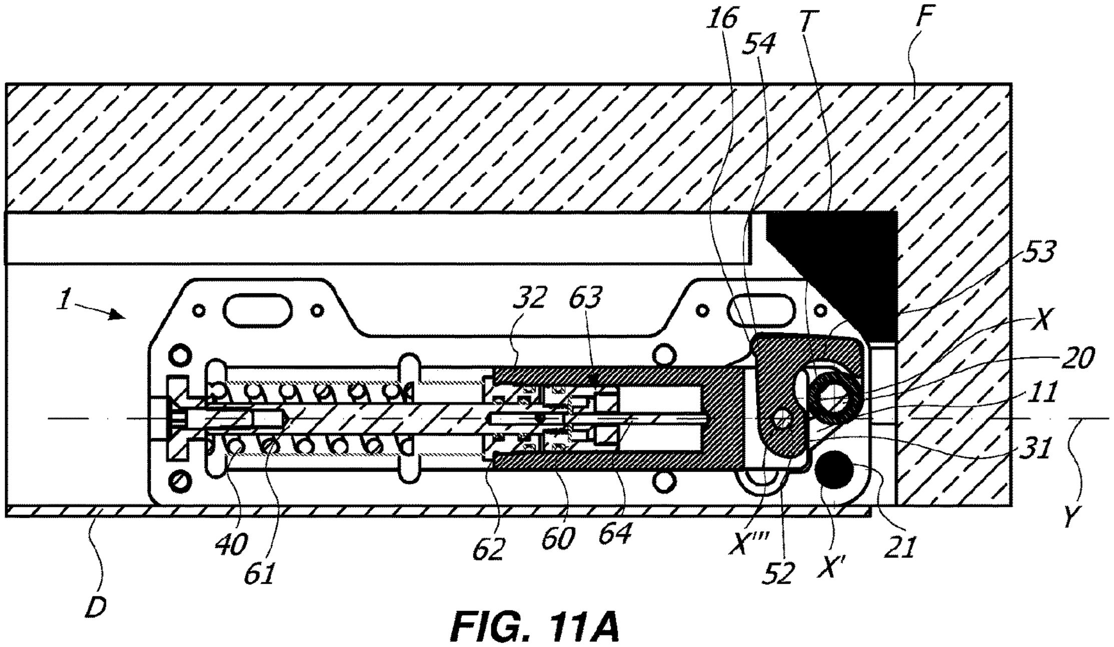
FIGS. 11A to 11F are cross-sectional figures during use of the third embodiment of the hinge 1 of FIG. 10 in respectively closed, open at 10°, open at 20°, open at 45°, open at 70° and open at 90° position.
Figure 11B:
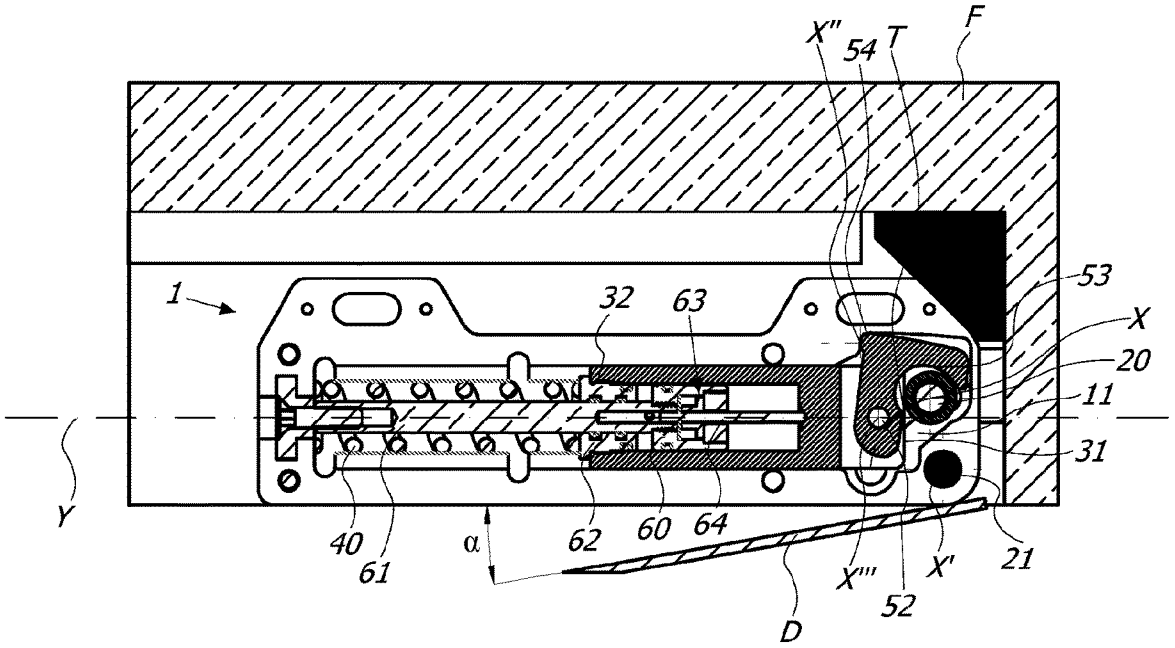
Figure 11C:
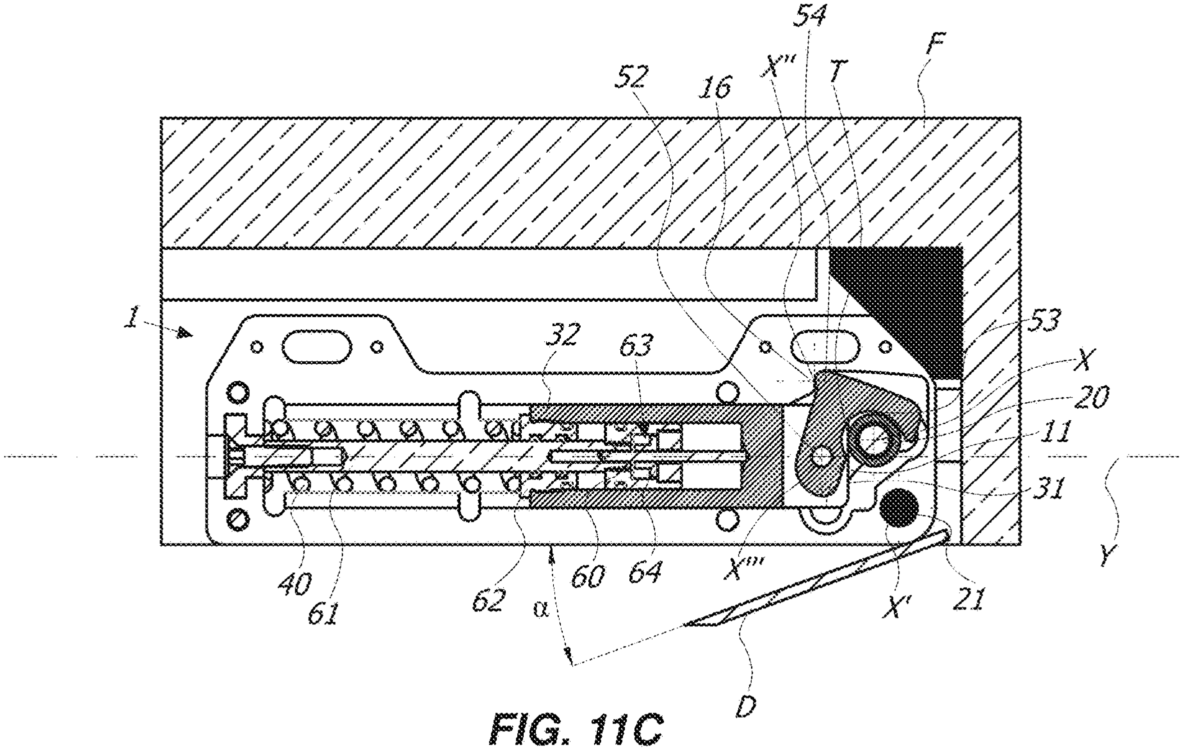
Figure 11D:
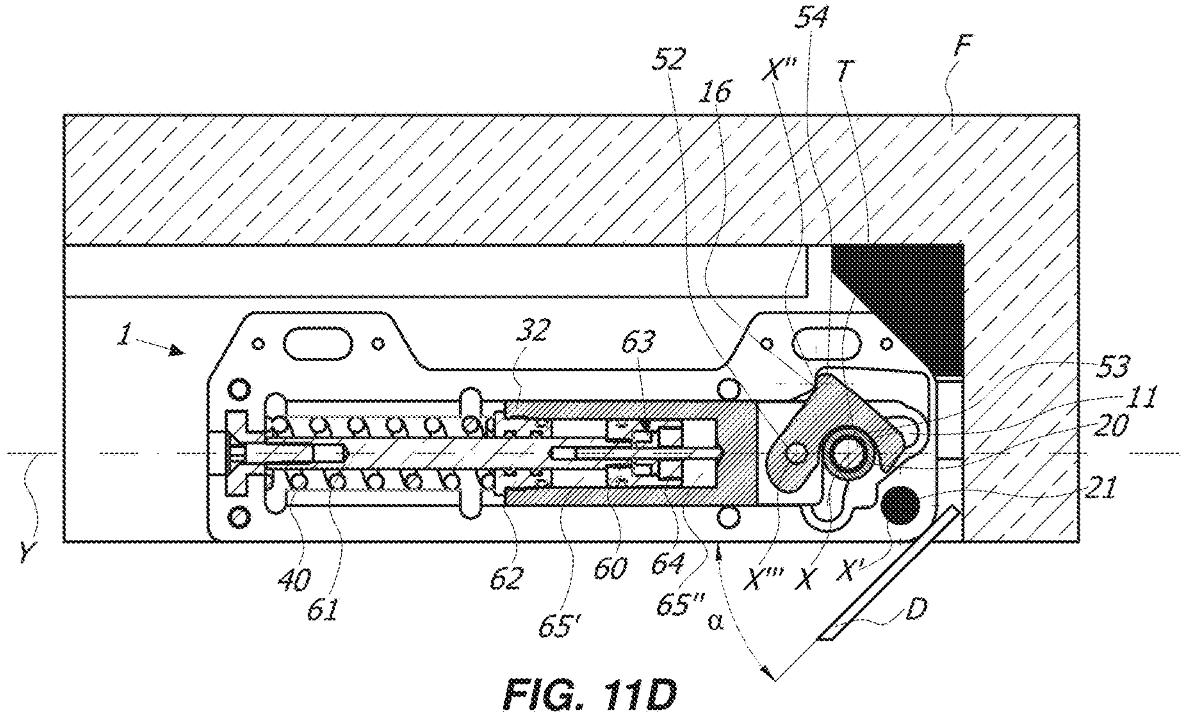
Figure 11E:
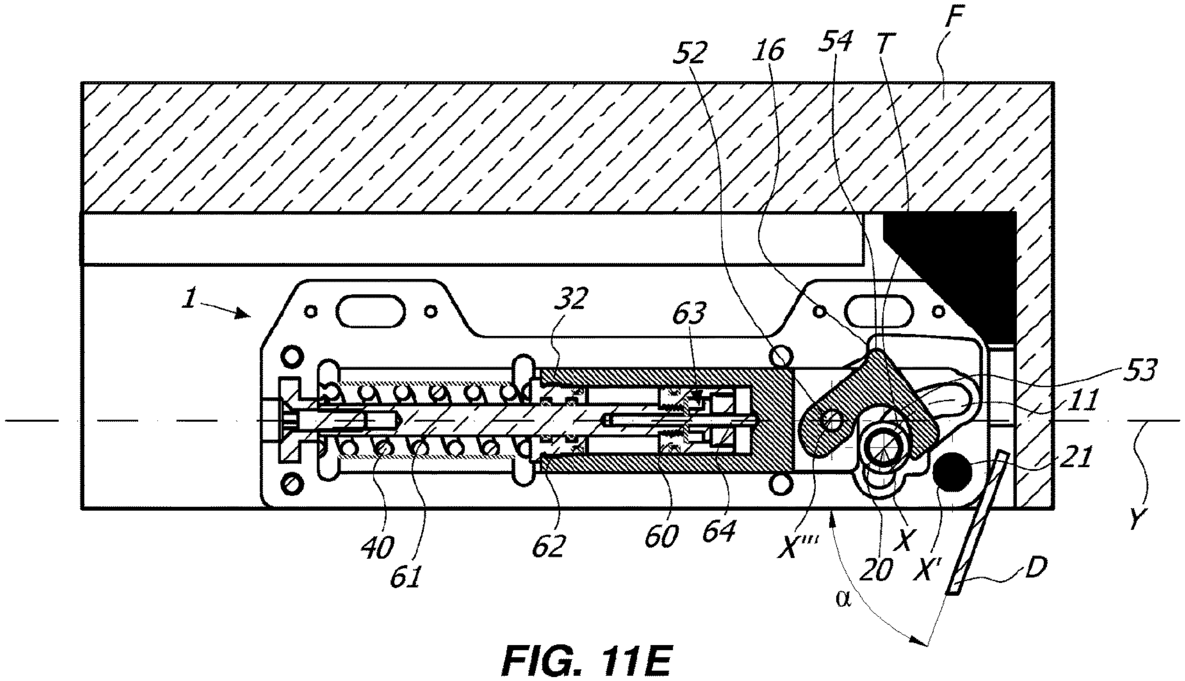
Figure 11F:
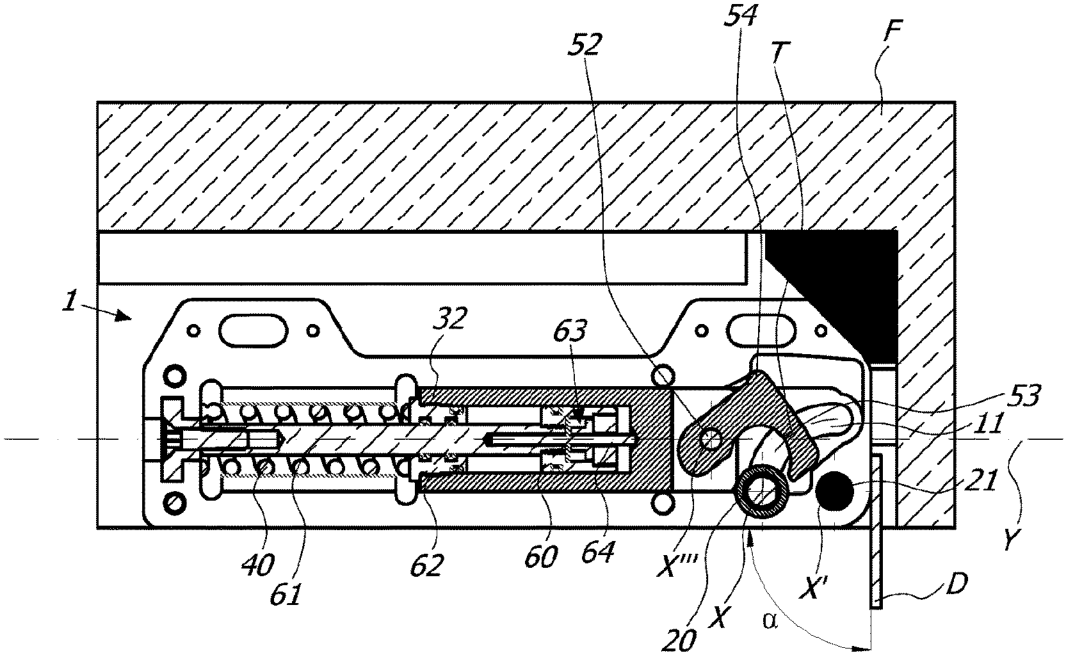
Figure 12:
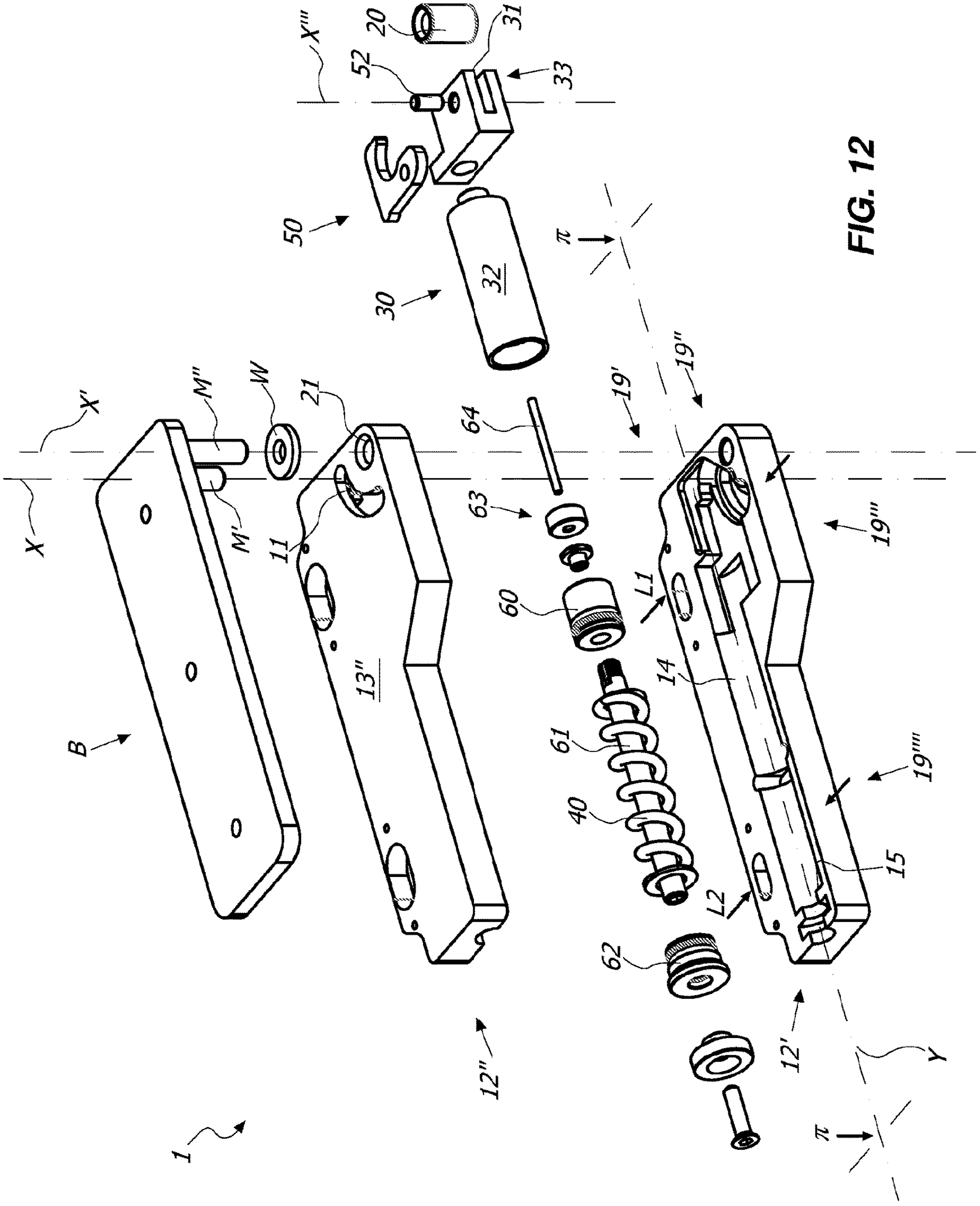
FIG. 12 is an axonometric exploded figure of a fourth preferred but not exclusive embodiment of the hinge 1.

Furthermore, FIGS. 10 to 11F show a hydraulically damped closing hinge, as better specified below.

Furthermore, FIGS. 12 to 14C show a further hydraulically damped closing hinge, as better specified below.

It is clear that such embodiments are merely for illustrative purposes of the invention. For example, the hinge 1 may also be a hydraulically or mechanically damped control hinge with or without a spring for returning the position of the slider.

Therefore, generally, the hinge body 10 may have a working chamber 14 with a slider 30 interacting with the female connection element 20 for sliding along the axis Y. In particular, the displacement of the female connection element 20 along the trajectory T defined by the curvilinear slot 11 and the sliding of the slider 30 along the axis Y will correspond to each other.

Advantageously, the slider 30 may include a cylinder 32 provided with a head 33 with a contact surface 31.

To this end, there may be provided for elastic counteracting means 40, for example one or more helical springs, acting on the slider 30 to push the contact surface 31 thereof against the female connection element 20.

Suitably, for example as shown in FIGS. 1-7, the elastic counteracting means 40 may be thrust means, so that the hinge 1 is a closing hinge, that is suitable to close shutter D once opened.

Preferably, the hinge 1 may have means for adjusting the thrust force of the elastic thrust means 40, for example a threaded grub screw 41' connected to a thrust device 42 engaged in an internally counter-threaded base 41" and accessible from the external by an operator through a through hole 41'", even when the hinge is mounted on the frame F.

Figure 4A:
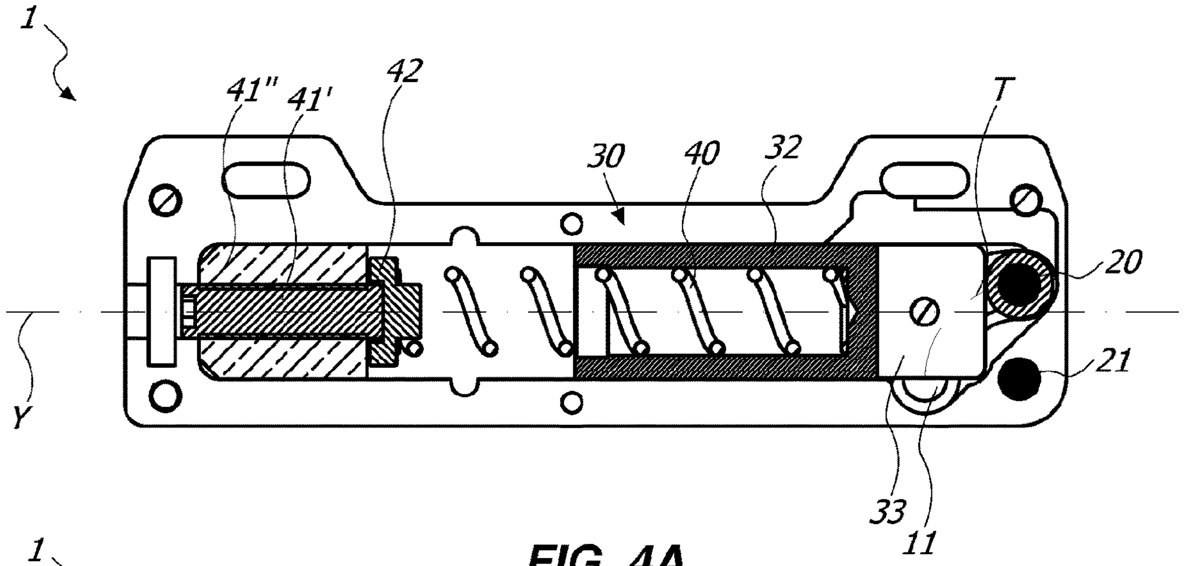
FIGS. 4A and 4B are respectively cross-sectional and top view figures of the first embodiment of the hinge 1 of FIGS. 1A and 1B in closed position.
Figure 4B:
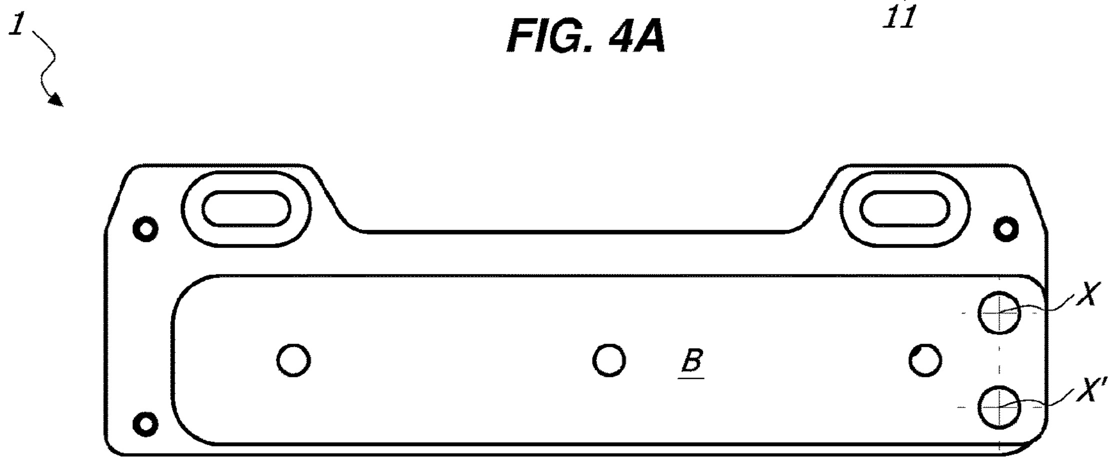
Figure 7:
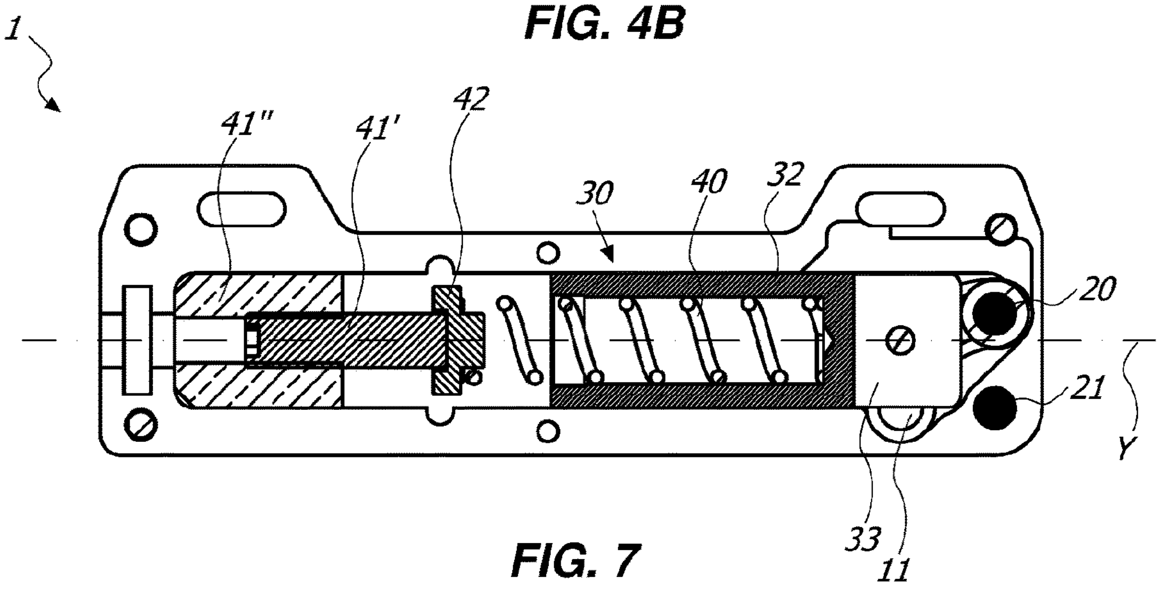
FIG. 7 is a cross-sectional figure of the first embodiment of the hinge 1 of FIGS. 1A and 1B wherein the closing force adjustment means 41', 41" are in maximum force position.
Figure 5A:
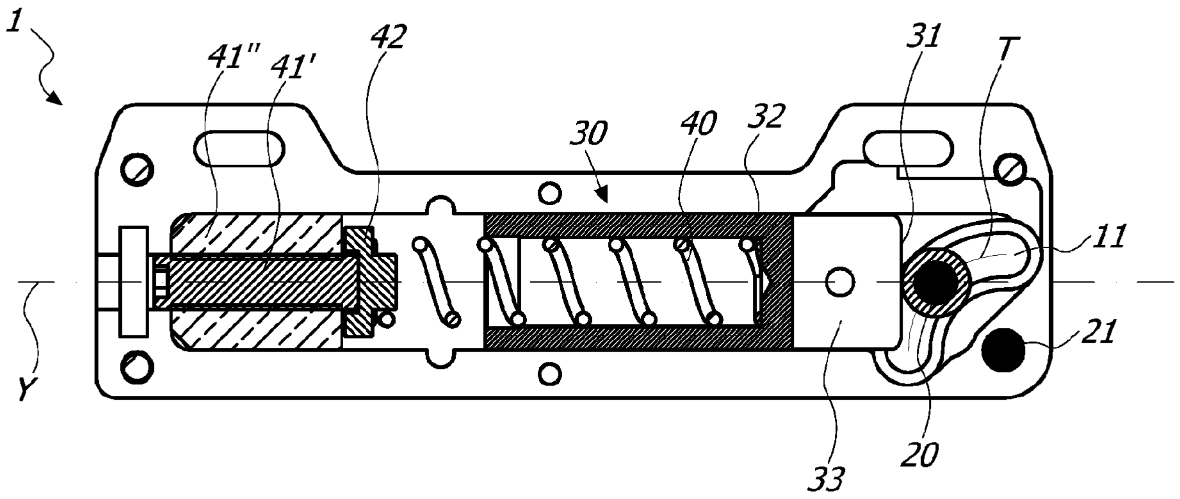
FIGS. 5A and 5B are respectively cross-sectional and top view figures of the first embodiment of the hinge 1 of FIGS. 1A and 1B in open position at 45°.
Figure 5B:
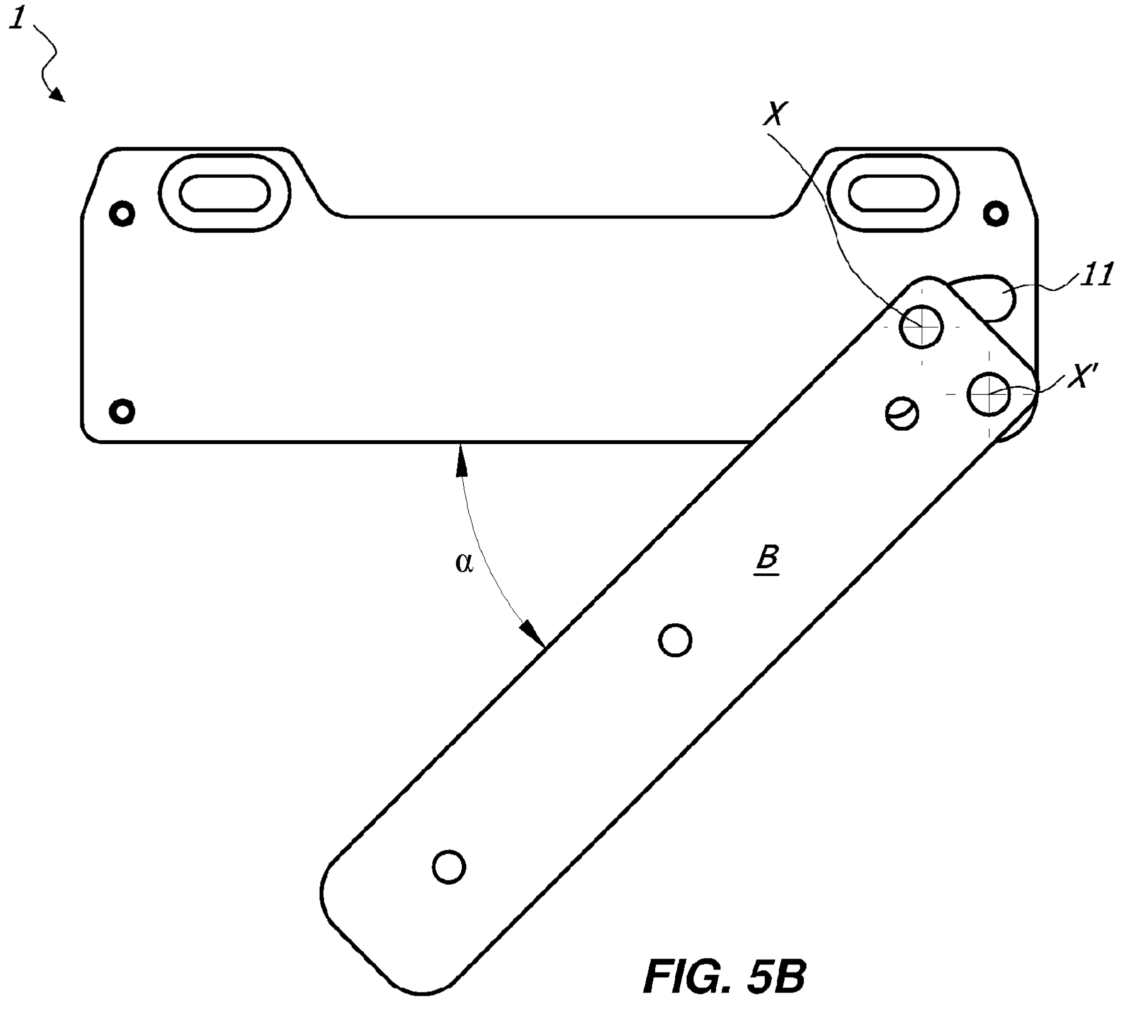
Figure 6A:
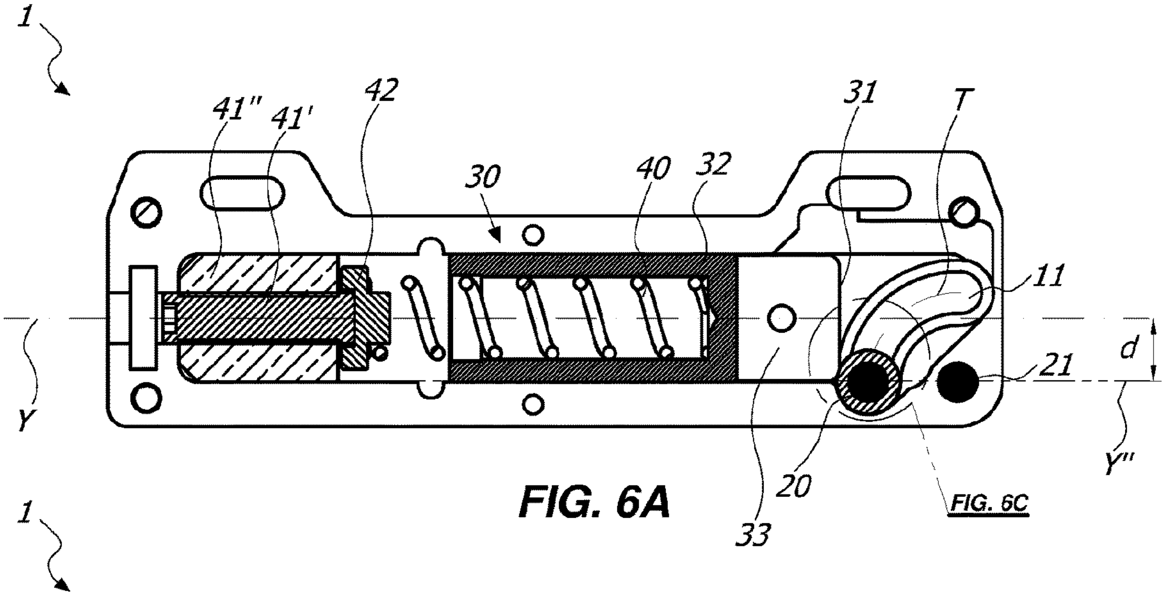
FIGS. 6A and 6B are respectively cross-sectional and top view figures of the first embodiment of the hinge 1 of FIGS. 1A and 1B in open position at 90°, with FIG. 6C showing some enlarged details.
Figure 6B:
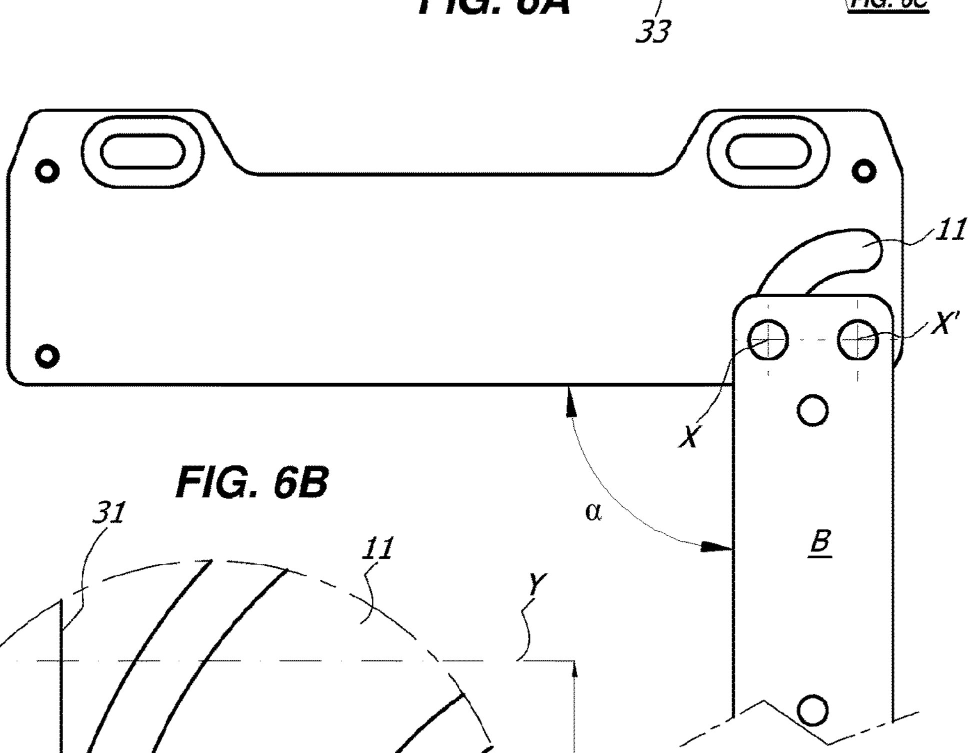

In this manner, acting with a specific tool on the threaded grub screw 41' through the hole 41'", the operator may adjust the precompression of the elastic counteracting means 40 between a minimum force position, for example shown in FIGS. 4A, 5A and 6A, and a maximum force position, for example shown in FIG. 7.

On the other hand, the elastic counteracting means 40 may be return means, that is without the force required to close the shutter D but suitable to restore the inoperative position of the slider 30, that is its position when the shutter D is closed.

As shown above, during the normal motion of the shutter D between the open and closed positions, the movement of the slider 30 and that of the female connection element 20 is integrally joined, that is the movement of one corresponds to the movement of the other and vice versa. To this end, the slider 30 and the female connection element 20 may preferably be in contact with each other.

However, in case of abnormal forcing of the shutter D, for example due to a gust of wind or an incautious user who closes it suddenly, there is the danger of uncontrolled impact of the shutter D against the frame F, with potential damage or breakage. In this case, as a matter of fact, the slider 30 and the female connection element 20 will take independent motions and therefore no longer integrally joined, moving away from each other.

In order to overcome this drawback, there may be provided for a safety element 50 designed to selectively come into contact with the female connection element 20 in case of the abnormal forcing mentioned above. Due to this impact, the uncontrolled motion of the female connection element 20 will be stopped by the safety element 50, and therefore an impact of the shutter D against the frame F will be prevented.

It is clear that there may also be provided for more than one safety element 50, and that the latter may be present on one of the slider 30 and the female connection element 20 and impact against each other, without departing from the scope of protection of the attached claims.

During the normal motion of the shutter D, the safety element 50 and the female connection element 20 may be at a mutual distance d', which may vary during such motion. Such distance d' is nullified only in case of the abnormal forcing mentioned above.

In a preferred but non-exclusive embodiment, the safety element 50 may have a first portion 51 rotatably coupled with the slider 30, for example using the pivot 52, a second portion 53 designed to selectively come into mutual contact with the cylindrical outer surface of the female connection element 20 and a third rounded or tapered portion 54 designed to come into contact with the abutment surface 16 of the hinge body 10.

In this manner, upon the opening and closing of the shutter D, that is upon the mutual rotation of the hinge body 10 and of the female connection element 20, driven by the slidable slider along the axis Y, the safety element 50 will rotate around a substantially vertical axis X" passing through the mutual contact point between the third rounded or tapered portion 54 and the abutment surface 16.

Such rotation is enabled by the rotoidal constraint between the slider 30 and the safety element 50 at the pivot 52, which allows a rotation around an axis X'" passes through the pivot 52.

In case of abnormal forcing, the second portion 53 of the safety element 50 and the outer surface of the female connection element 20, which normally have the mutual distance d', will come into contact.

In order to guide the movement of the safety element 50, the working chamber 14 may have a flat surface 17 substantially parallel to the plane $\pi$ suitable to come into contact with a corresponding abutment surface 55 of the safety element 50.

Figure 13A:
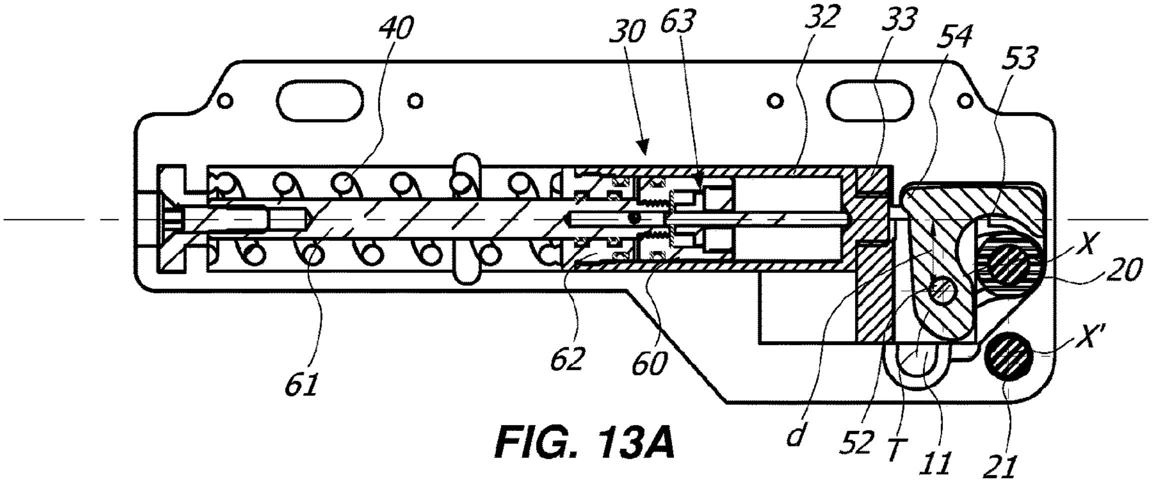
FIGS. 13A, 13B and 13C are cross-sectional figures of the fourth embodiment of the hinge 1 of FIG. 12 in respectively closed, open at 45° and open at 90° position.
Figure 13B:
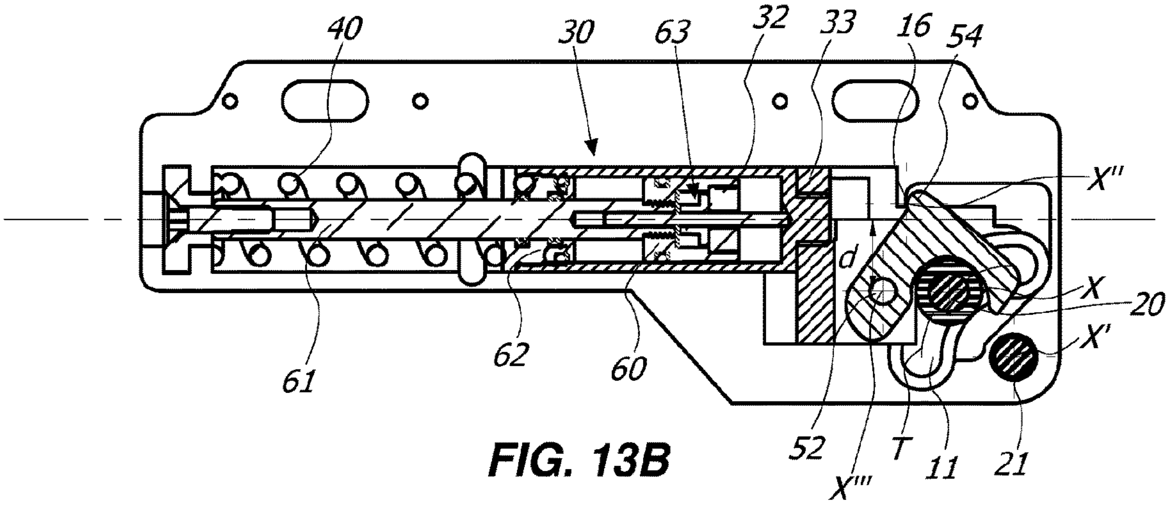
Figure 13C:
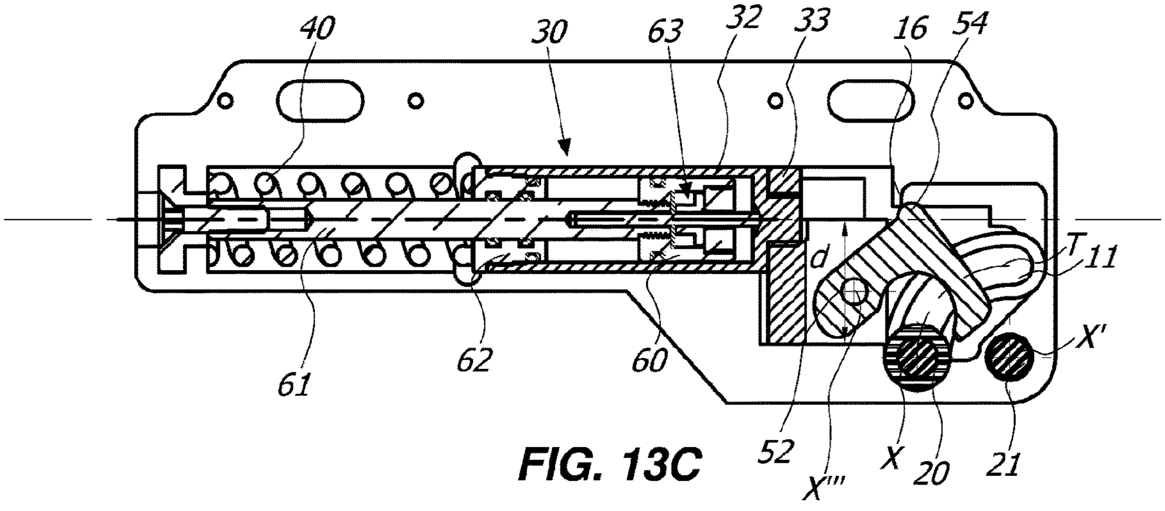
Figure 14B:
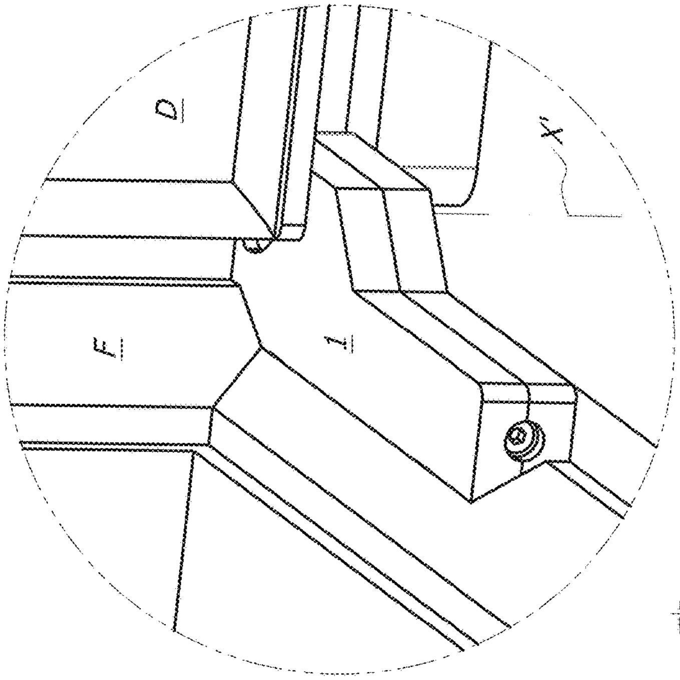
FIG. 14A is a schematic figure for assembling a shutter D on a frame F through the embodiment of the hinge 1 of FIG. 12, with FIGS. 14B and 14C showing some enlarged details.
Figure 14C:
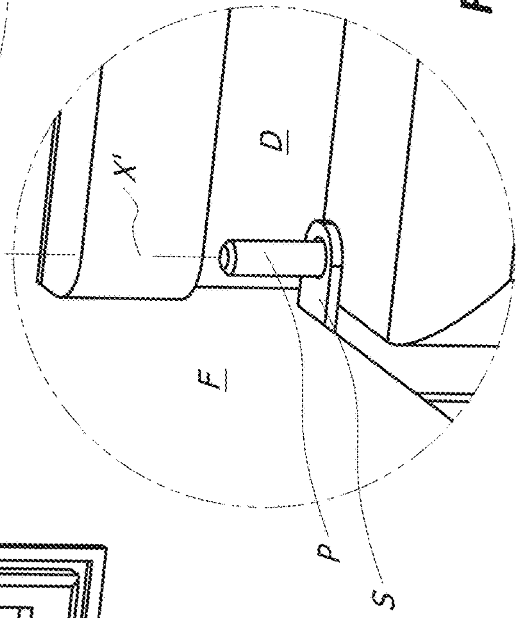
Figure 14A:
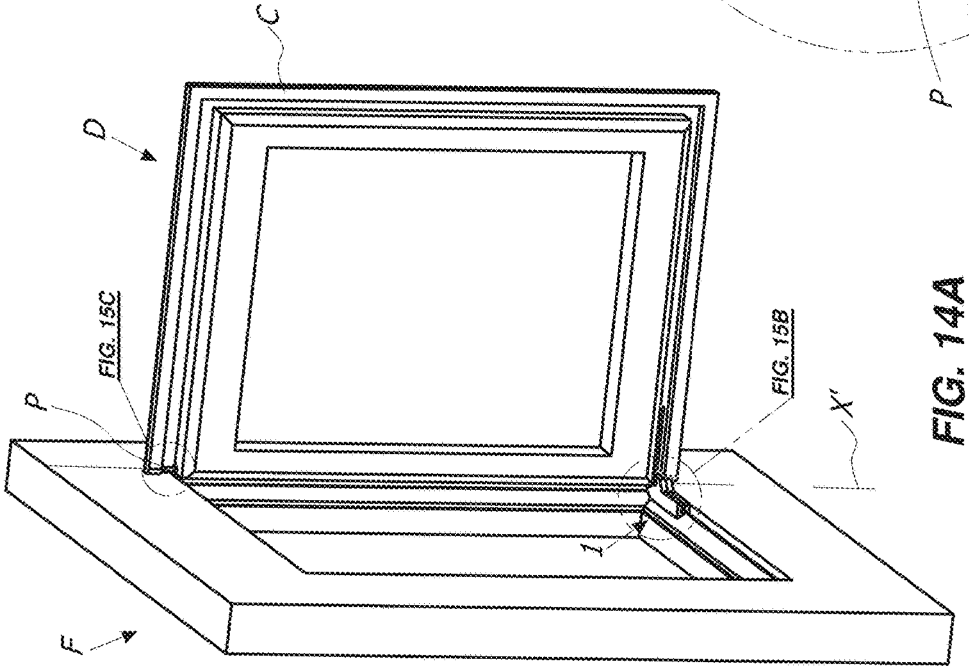

In order to enable a user to release the shutter D without feeling resistance from the maximum opening position, for example shown in FIGS. 9C, 11F and 13C, the distance d' between the second portion 53 of the safety element 50 and the outer surface of the female connection element 20 may be relatively high. For example, such distance may enable the user to move the shutter D from the open position at 90° up to 80° without feeling resistance.

It is clear that the safety element 50 may be inserted into any hinge which includes a slider and a connection element operatively connected with a closing element.

The elastic counteracting means 40 may enable to keep the shutter D in the open position.

Figure 6C:
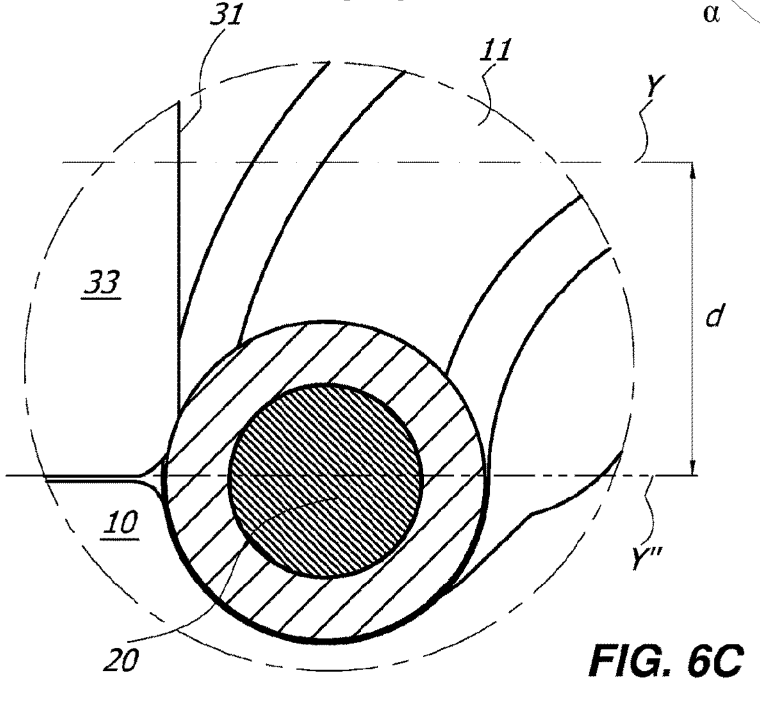

To this end, for example as shown in FIG. 6C, the curvilinear guide slot 11 may be configured and/or sized so that when the female connection element 20 and the hinge body 10 are in the open position, the contact point between the slider 30 and the female connection element 20 is beyond the symmetry axis Y" of the latter substantially parallel to the axis Y. In this manner, as a matter of fact, the action of the elastic counteracting means 40 will keep the shutter D in the open position.

In order to minimise or eliminate the hazard of injury or damage to people or property due to the impact of the swing shutter D against the frame F, there may be provided for special means for damping the movement of the slider 30, which may be of the hydraulic type, for example as shown in FIGS. 10-13C, or mechanical type, for example as shown in FIGS. 8-9D.

The hydraulic damping means may be of the per se known type, for example obtained according to the disclosure of the international patent application PCT/IB2015/050603 on behalf of the Applicant of this patent.

Therefore, they may include a partitioning element 60 connected to a rod 61 in turn fixed to the bottom wall 15. On the rod 61, which may define the axis Y, there may be coaxially inserted the elastic counteracting means 40 and a plug 62.

The partitioning element 60 may be inserted into the cylinder 32 together with valve means 63 and a through pivot 64 suitable to be inserted passing through in the partitioning element 60 to obtain a calibrated passage between two variable volume compartments 65', 65".

The cylinder is filled with a hydraulic damping fluid, for example oil, and it is closed by a plug 62.

Upon the mutual rotation between the female connection element 20 and the hinge body 10, the slidable movement of the slider 30 will cause the through-flow of the hydraulic damping fluid between the variable volume compartments 65', 65" and the ensuing hydraulic damping of such slidable movement.

Should the slider 30 be provided with the safety element 50 on the female connection element 20, the hinge 1 may be without elastic counteracting means 40 and act as a hydraulic damping hinge.

In another preferred but not exclusive embodiment, for example shown in FIGS. 8-9C, the damping means may be of the mechanical type. Suitably, also the latter may be of the per se known type, for example obtained according to the disclosure of the international patent application PCT/IB2020/056291 on behalf of the Applicant of this patent.

In this case, the elastic counteracting means may provide for a first 40 and a second 43 spring, acting in phase opposition. Both springs 40, 43 may be coaxially inserted into a rod 70 passing through an abutment plate 71 and having a first end 72' inserted through the cylinder 32 to be screwed onto the slider 30 and a second opposite end 72" on which there is screwed a screw 73 for adjusting the force acting on the spring 43.

Therefore, the latter may be interposed between the screw 73 and the abutment plate 71, while the other spring 40 may be interposed between the abutment plate 71 and the slider 30 and inserted into the cylinder 32 of the latter.

The abutment plate 71 may be fixed to the hinge body 10 by means of a cavity 18 obtained in the working chamber 14. The springs 40, 43 may act on opposite sides of the abutment plate 71.

In this manner, the spring 40 will allow to return the shutter D to the closed position once opened, while the spring 43 will oppose the force of the spring 40 to mechanically dampen the movement of the slider 30. Acting suitably on the screw 73 enables to adjust the precompression of the spring 43, and therefore the damping force.

In another preferred but not exclusive embodiment, for example shown in FIGS. 12-14C, the hinge 1 may be configured for shutters D mounted cantilevered on the frame F, that is wherein the rotation axis X' of the shutter D is external to the latter. In this case, the frame F includes protruding brackets S for fixing the pivots P of the shutter D.

To this end, the hinge body 10 may include a fastening portion 19' which can be fastened on the frame F and a protruding portion 19" designed to protrude from the frame F to support the weight of the shutter D and discharge it on the latter using the fastening portion 19'. Therefore, the hinge body will have a front portion 19'" having a width L1 greater than that L2 of the rear portion 19"".

In order to guarantee an optimal operation of the hinge 1, the working chamber 14 may extend at the fastening portion 19', while the curvilinear slot 11 may be arranged at the protruding portion 19".

In order to guarantee the operative connection between the female connection element 20 and the slider 30, the latter may include the cylinder 32 and a head 33 staggered with respect to the axis Y. More particularly, the axis X'" passes through the pivot 52 may have a predetermined distance d.

Suitably, in order to facilitate the assembly of the hinge 1, the cylinder 32 and the head 33 may be connected to each other in a removable manner.

It is clear that even if such embodiment has been shown with the hydraulic damping means described above, it may include mechanical damping means or it may be without elastic counteracting means without departing from the scope of protection of the attached claims.

Figure 16A:
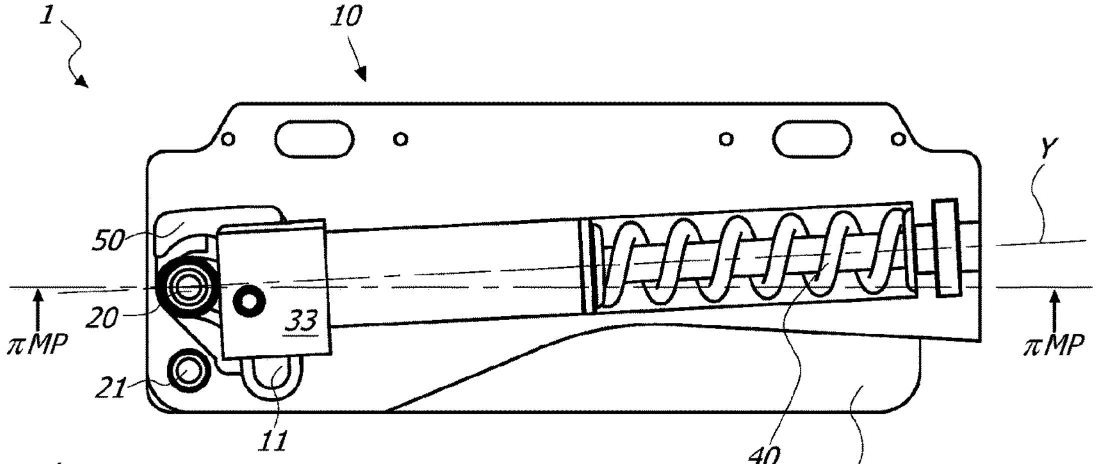
FIGS. 16A, 16B and 16C are cross-sectional figures of a further preferred but not exclusive embodiment of the hinge 1 respectively in closed, open at 45° and open at 90° position.
Figure 16B:
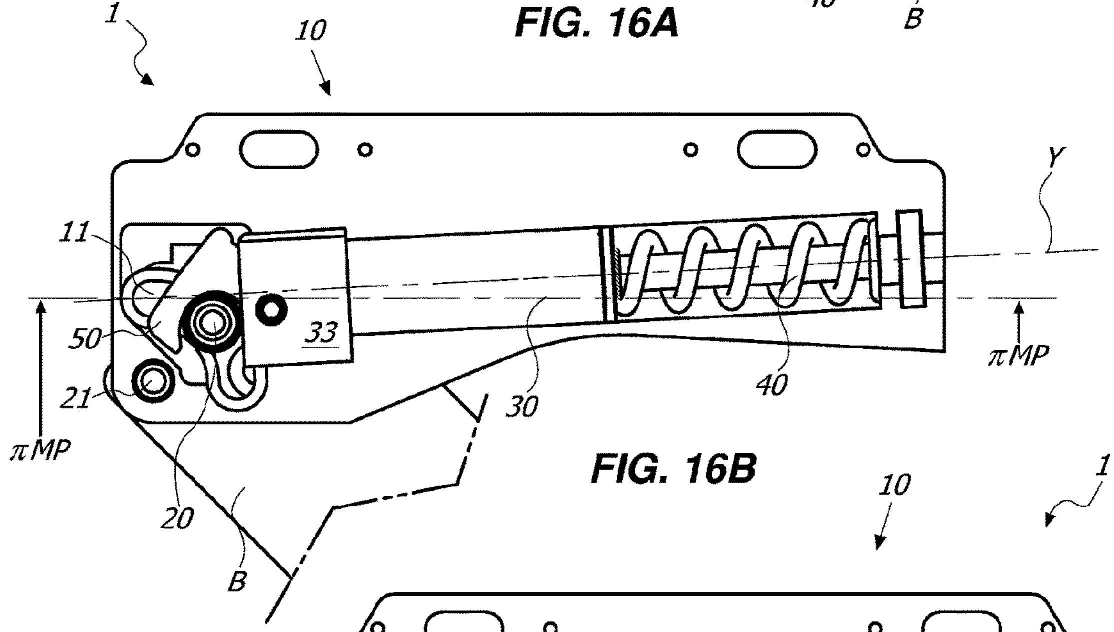
Figure 16C:
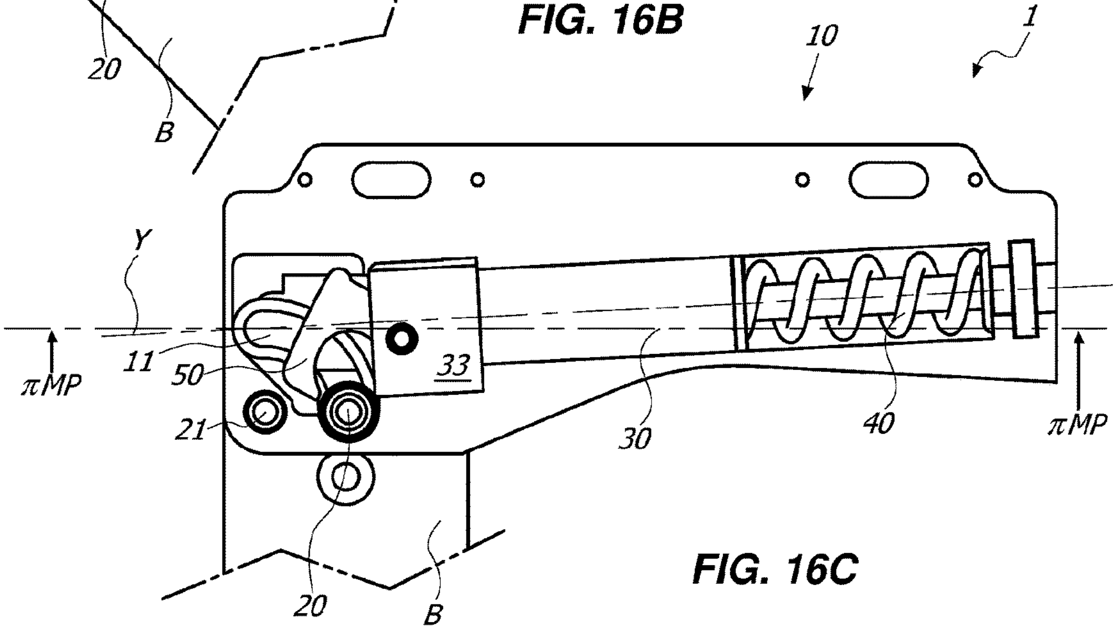

In a further preferred but not exclusive embodiment, for example shown in FIGS. 16A-16C, the hinge 1 may have the axis Y inclined with respect to a median plane πMP substantially perpendicular to the plane π. In particular, the axis Y may converge towards the female connection element 21.

This enables to displace towards the external of the hinge body 10 the trajectory T of the female connection element 21, making such embodiment particularly preferable for shutters D mounted cantilevered on the frame F.

It is clear that, similarly to the embodiments illustrated herein, also such embodiment may possibly include mechanical or hydraulic damping means or it may be without elastic counteracting means, without departing from the scope of protection of the attached claims.

In the light of the above, the present invention attains the pre-established objects.

The present invention may include various parts and/or similar or identical elements. Unless otherwise specified, similar or identical parts and/or elements will be indicated using a single reference number, it being clear that the described technical characteristics are common to all similar or identical parts and/or elements.

The invention is susceptible to numerous modifications and variants, all falling within the scope of protection of the attached claims. All details can be replaced by other technically equivalent elements, and the materials can be different depending on the needs, without departing from the scope of protection of the invention defined by the attached claims.

The invention claimed is:

1. A system for closing and/or controlling a swing closing element mutually connected with a stationary support structure, the swing closing element being configured to be connected to the stationary support structure to rotate around a rotation axis, the system comprising:

a first and a second female or male connection element spaced from each other and respectively defining a first and a second axis parallel to each other, the second axis defining the rotation axis;

a hinge comprising:

a hinge body configured to be be fixed to the stationary support structure, and a third male or female connection element defining a third axis and configured to be engaged with the first female or male connection element so that the first and the third axis coincide, wherein the hinge body internally comprises a slider interacting with the third male or female connection element to slide along a fourth axis perpendicular to the third axis, and a fourth male or female connection element defining a fifth axis parallel to the third axis, the fourth male or female connection element being configured to be engaged with the second female or male connection element so that the second and the fifth axis can coincide, wherein the third male or female connection element can be operatively connected with the fourth male or female connection element, the fourth male or female connection element being monolithic with the stationary support structure or configured to be fixed and integrally joined with the stationary support structure, wherein the hinge body comprises a curvilinear guide slot defining an angular trajectory lying on a plane perpendicular to the third axis, the third male or female connection element being slidably engaged in the curvilinear guide slot so that upon a rotation of the swing closing element around the second axis, the third axis moves along the angular trajectory rotating around the fifth axis, and wherein the third and the fourth male or female connection element are removably engageable with the first and second female or male connection element, respectively; and a bracket for fastening to the swing closing element, the bracket comprising the first and the second female or male connection element.

2. The system according to claim 1, wherein the hinge body comprises the fourth male or female connection element.

3. The system according to claim 2, wherein the hinge body has a prismatic shape with quadrangular base, the fourth male or female connection element being arranged in an angular position on the hinge body.

4. The system according to claim 1, wherein the hinge body is substantially plate-shaped to define the plane.

5. The system according to claim 1, wherein the hinge body includes a first and a second outer surface opposite to each other with respect to a first median plane interposed therebetween parallel to or coincident with the plane, the first and the second connection element being configured to be engageable with the third and the fourth connection element at both the first and the second outer surface, so that the hinge is ambidextrous by rotating around a sixth axis lying on the first median plane.

6. The system according to claim 5, wherein both the third and the fourth connection element are female, the curvilinear guide slot and the third and the fourth female connection elements passing through the hinge body to extend between the first and the second outer surface, the first and the second connection element being both male.

7. The system according to claim 1, wherein the hinge body has at least one working chamber into which there is inserted the slider, which comprises a contact surface configured to come into contact with the third male or female connection element.

8. The system according to claim 1, wherein the hinge body further internally comprises elastic counteracting means acting on the slider.

9. The system according to claim 8, further comprising means for adjusting a force acting on the elastic counteracting means to adjust a precompression thereof.

10. The system according to claim 8, wherein upon the rotation of the swing closing element around the second axis, the third male or female connection element moves between a first position corresponding to an open position of the swing closing element and a second position corresponding to a closed position thereof, the third male or female connection element having a cylindrical outer surface, the curvilinear guide slot being configured and/or sized so that when the third male or female connection element is in the first position, a contact point between the slider and the third male or female connection element is beyond a symmetry axis (Y") of the third male or female connection element parallel to the fourth axis, so that an action of the elastic counteracting means keeps the swing closing element in the open position.

11. The system according to claim 1, wherein the hinge body further comprises internally damping means for a hydraulic or mechanical damping of a movement of the slider along the fourth axis.

12. The system according to claim 1, wherein the hinge body includes a fastening portion, which can be fixed to the stationary support structure, and a protruding portion arranged to protrude from the stationary support structure to support a weight of the swing closing element and discharge the weight on the stationary support structure through the fastening portion.

13. A system for closing and/or controlling a swing closing element mutually connected with a stationary support structure, the swing closing element being configured to be connected to the stationary support structure to rotate around a rotation axis, the system comprising:

a first and a second female or male connection element spaced from each other and respectively defining a first and a second axis parallel to each other, the second axis defining the rotation axis;

a hinge comprising:

a hinge body configured to be be fixed to the stationary support structure, and a third male or female connection element defining a third axis and configured to be engaged with the first female or male connection element so that the first and the third axis coincide, wherein the hinge body internally comprises a slider interacting with the third male or female connection element to slide along a fourth axis perpendicular to the third axis, and a fourth male or female connection element defining a fifth axis parallel to the third axis, the fourth male or female connection element being configured to be engaged with the second female or male connection element so that the second and the fifth axis can coincide, wherein the third male or female connection element can be operatively connected with the fourth male or female connection element, the fourth male or female connection element being monolithic with the stationary support structure or configured to be fixed and integrally joined with the stationary support structure, wherein the hinge body comprises a curvilinear guide slot defining an angular trajectory lying on a plane perpendicular to the third axis, the third male or female connection element being slidably engaged in the curvilinear guide slot so that upon a rotation of the swing closing element around the second axis, the third axis moves along the angular trajectory rotating around the fifth axis, and wherein the third and the fourth male or female connection element are removably engageable with the first and second female or male connection element, respectively; and the swing closing element, the swing closing element comprising the first and the second female or male connection element.

* * * * *